US012118916B2

United States Patent
Yang et al.

(10) Patent No.: US 12,118,916 B2
(45) Date of Patent: Oct. 15, 2024

(54) IMAGE DISPLAY APPARATUS WITH AI-BASED IMAGE PROCESSING

(71) Applicant: LG ELECTRONICS INC., Seoul (KR)

(72) Inventors: Jeonghyu Yang, Seoul (KR); Seoksoo Lee, Seoul (KR); Jingyeong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

(21) Appl. No.: 17/599,385

(22) PCT Filed: Mar. 27, 2020

(86) PCT No.: PCT/KR2020/004162
§ 371 (c)(1),
(2) Date: Sep. 28, 2021

(87) PCT Pub. No.: WO2020/204472
PCT Pub. Date: Oct. 8, 2020

(65) Prior Publication Data
US 2022/0198994 A1 Jun. 23, 2022

(30) Foreign Application Priority Data
Mar. 29, 2019 (KR) ........................ 10-2019-0037434

(51) Int. Cl.
*G09G 3/30* (2006.01)
*G06F 3/00* (2006.01)
(Continued)

(52) U.S. Cl.
CPC ........... *G09G 3/2096* (2013.01); *G06F 3/005* (2013.01); *G06F 3/147* (2013.01); *G06F 3/162* (2013.01);
(Continued)

(58) Field of Classification Search
CPC ...... G06F 3/162; G06F 3/167; G09G 2320/08
See application file for complete search history.

(56) References Cited

U.S. PATENT DOCUMENTS

2008/0278635 A1* 11/2008 Hardacker ............... H04N 5/44
348/734
2012/0293528 A1* 11/2012 Larsen ..................... G09G 3/20
345/589

(Continued)

FOREIGN PATENT DOCUMENTS

JP 3131664 U 5/2007
JP 2013-97298 A 5/2013
(Continued)

*Primary Examiner* — Sanghyuk Park
(74) *Attorney, Agent, or Firm* — Birch, Stewart, Kolasch & Birch, LLP

(57) ABSTRACT

The present disclosure relates to an image display apparatus. The image display apparatus according to an embodiment of the present disclosure comprises: a signal processor configured to perform image processing of an input image, and audio processing of audio corresponding to the input image; a virtual sensor device configured to receive image and audio information processed by the signal processor; a sensor device configured to collect externally captured image information or sound information; and an artificial intelligence (AI) processor configured to perform the image processing of the input image or the audio processing based on AI using the image and audio information from the virtual sensor device, and the image or sound information from the sensor device. Accordingly, the image display apparatus may operate based on AI.

19 Claims, 28 Drawing Sheets

(51) Int. Cl.
  *G06F 3/147*   (2006.01)
  *G06F 3/16*    (2006.01)
  *G09G 3/20*    (2006.01)
  *G09G 3/36*    (2006.01)

(52) U.S. Cl.
  CPC ......... *G06F 3/167* (2013.01); *G09G 2320/08* (2013.01); *G09G 2370/12* (2013.01)

(56) References Cited

U.S. PATENT DOCUMENTS

| | | | |
|---|---|---|---|
| 2017/0041568 A1* | 2/2017 | Rakshit | G06F 3/0346 |
| 2020/0152138 A1* | 5/2020 | Kim | A63F 13/52 |
| 2020/0219467 A1* | 7/2020 | Okamoto | G09G 5/37 |
| 2023/0040176 A1* | 2/2023 | Bau | G06N 3/0475 |

FOREIGN PATENT DOCUMENTS

| | | |
|---|---|---|
| KR | 10-2014-0115919 A | 10/2014 |
| KR | 10-2017-0106047 A | 9/2017 |
| KR | 10-2019-0031032 A | 3/2019 |

* cited by examiner (a) (b) (c)

FIG. 11B

| conv | = | conv | bn | relu | | | |
|---|---|---|---|---|---|---|---|
| conv fc | = | conv dw | bn | relu | conv pw | bn | relu |
| fc | = | fc | bn | relu | | | |

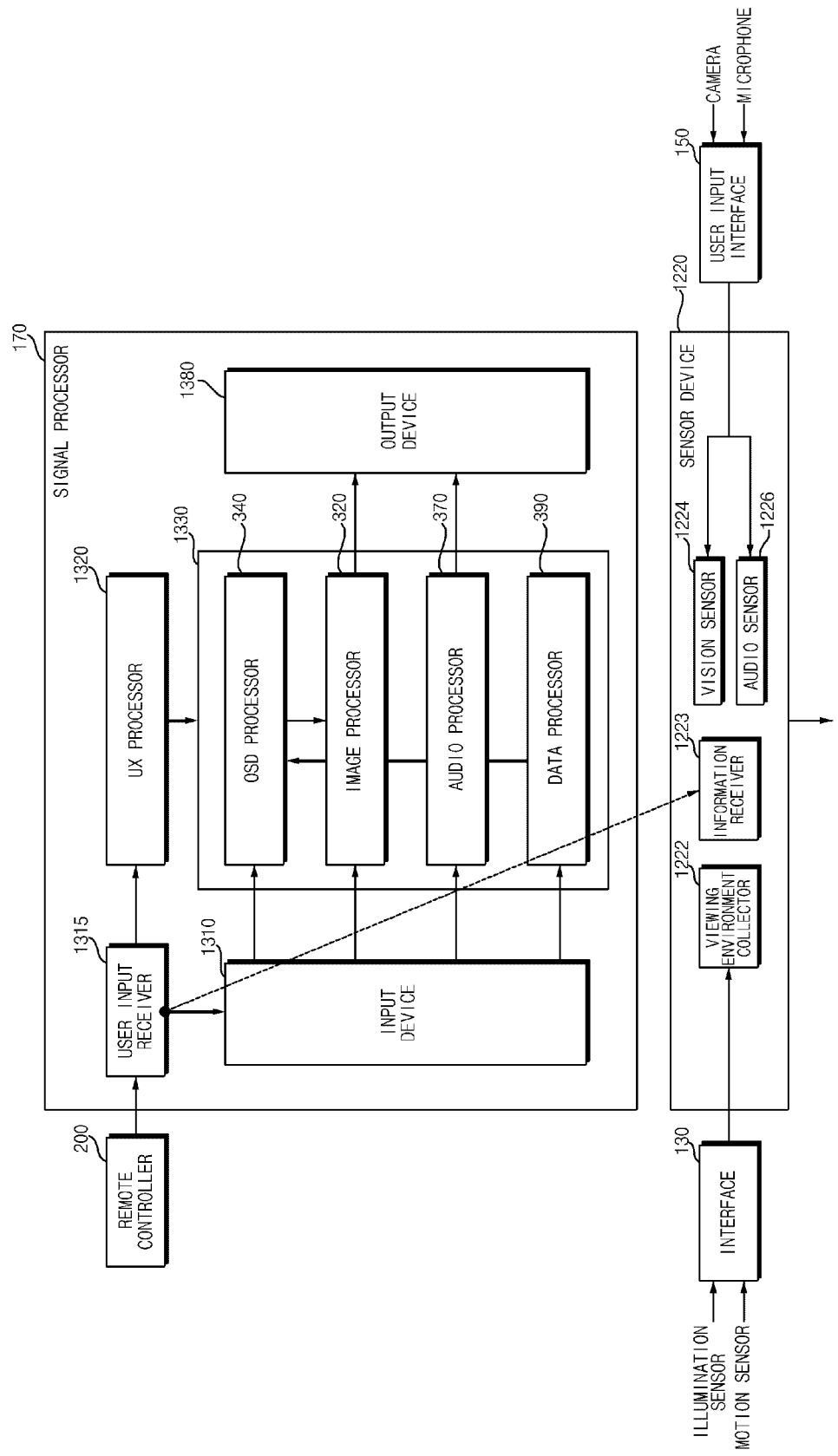

FIG. 15A

| ACTUAL SENSOR INPUT | EXTRACTED INFORMATION | EXTRACTED CONTEXT |
|---|---|---|
| ACTUAL VISION (CAMERA) | • VIEWER EXPRESSION AND GESTURE<br>• VIEWER RECOGNITION | • CURRENT RESPONSE AND RESPONSE CHANGE<br> - BORED, EXPRESSIONLESS, IRRITATED, IMMERSED, CONCENTRATED, INTERESTED |
| ACTUAL SOUND (MICROPHONE) | • SEARCH INFORMATION AND TASTE/PREFERENCE<br>• VIEWER RESPONSE EXPRESSION | • SEARCH AND TASTE/FREQUENCY OF PREFERRED SELECTION<br>• CURRENT EMOTION |
| ACTUAL INFORMATION (REMOTE CONTROL) | • INPUT SELECTION<br>• TV SETTING INFORMATION | • PREFERRED INPUT/CHANNEL<br>• PREFERRED SETTING |
| ACTUAL INFORMATION (AMBIENT BRIGHTNESS) | • AMBIENT BRIGHTNESS | • TASTE IN ENVIRONMENT<br>• SCREEN BRIGHTNESS |
| ACTUAL INFORMATION (MOTION SENSOR) | • INFORMATION WHETHER USER VIEWS VIDEO | • VIEWING CONCENTRATION |

FIG. 15B

| ACTUAL SENSOR INPUT | | INFORMATION PROCESSING | OUTPUT |
|---|---|---|---|
| REMOTE CONTROL | POWER ON | STATISTICS ABOUT POWER ON TIME FOR EACH DAY OF THE WEEK | WAKE-ON AND GUIDANCE AT CORRESPONDING TIME |
| | CHANNEL CONTROL | STATISTICS ABOUT VIEWED CHANNEL FOR EACH DAY/TIME | AUTOMATIC CHANNEL SETTING WHEN POWERED ON |
| | VOLUME CONTROL | ANALYZE VIEWER'S VOLUME CONTROL ACTION IN RESPONSE TO AMBIENT NOISE | AUTOMATIC VOLUME CONTROL |
| | IMAGE QUALITY CONTROL | ANALYZE VIEWER'S IMAGE QUALITY CONTROL ACTION IN RESPONSE TO AMBIENT NOISE | AUTOMATIC IMAGE QUALITY CONTROL |
| | AMBIENT NOISE | ANALYZE AMBIENT NOISE, UTTERANCE MADE BY VIEWER | ADAPTIVE VOLUME CONTROL IN RESPONSE TO AMBIENT NOISE AND UTTERANCE MADE BY VIEWER |
| REMOTE CONTROL | WAKE UP WORD | RECOGNIZE WAKE UP WORD(DEVICE) | WAKE AND PROCESS FOLLOW-UP INPUT |
| | VOICEPRINT | RECOGNIZE VOICEPRINT(SERVER) | PROCESS RECOGNIZED VOICEPRINT |
| ILLUMINATION | AMBIENT BRIGHTNESS | CONVERT BRIGHTNESS MAGNITUDE INTO NUMERICAL VALUE(DEVICE) | BRIGHTNESS ADAPTIVE CONTRAST CONTROL |
| POSITION /MOTION | PRESENCE OF VIEWER | ANALYZE PRESENCE OF VIEWER NEAR TV | TURN OFF TV AND CHANGE TO MINIMUM OPERATION MODE WHEN NO VIEWER IS PRESENT |
| | VIEWER POSITION | ANALYZE ANGLE FORMED BETWEEN VIEWER AND TV | ADJUST IMAGE QUALITY/SOUND POSITION SUITABLE FOR VIEWING ANGLE |

FIG. 18

| STAGE | BRIGHTNESS | CONTRAST | SHARPNESS | CHROMA | ... |
|-------|------------|----------|-----------|--------|-----|
| 0 | $B_0$ | $C_0$ | $S_0$ | $A_0$ | ... |
| 1 | $B_1$ | $C_1$ | $S_1$ | $A_1$ | ... |
| ... | ... | ... | ... | ... | ... |
| K-1 | $B_{K-1}$ | $C_{K-1}$ | $S_{K-1}$ | $A_{K-1}$ | ... |

FIG. 20

| VIRTUAL SENSOR INPUT RECOGNITION | | INFORMATION PROCESSING | OUTPUT |
|---|---|---|---|
| AUDIO | SOUND QUALITY OF CONTENT | SOUND QUALITY CLASSIFICATION | OPTIMAL TUNING OF EACH SOUND QUALITY ELEMENT |
| | GENRE OF CONTENT | USE OF AUDIO CHARACTERISTIC INFORMATION | AUTOMATIC SOUND MODE SETTING FOR EACH GENRE |
| | OBJECT SOUND | SOUND TYPE CLASSIFICATION | SOUND QUALITY TUNING FOR EACH SOUND TYPE OBJECT RECOGNITION AND CONVERSION WITH A VIEWER |
| | SPEECH | SPEECH TO TEXT | IDENTIFYING DETAILS OF TEXT-BASED CONTENT |
| | BROADCAST EPG | CONNECT SELECTED CONTENT INFORMATION WITH TASTE IN VIEWING CONNECT FREQUENCY OF SELECTION WITH VIEWING HABIT | CAPTION, PROVIDED AS VOICE, TO TEXT AUTOMATIC RESERVATION FOR VIEWING AUTOMATIC TURNING ON OF TV |
| METADATA | HDMI, SEI | USING HDMI, SEI STANDARD METADATA | AV PROCESSING ACCORDING TO STANDARDS |
| | TEXT CAPTION | USING TEXT DATA PROVIDED AS CAPTION | IDENTIFYING DETAILS OF TEXT-BASED CONTENT |
| | VOICE CAPTION | CAPTION, PROVIDED AS VOICE, TO TEXT | IDENTIFYING DETAILS OF TEXT-BASED CONTENT |

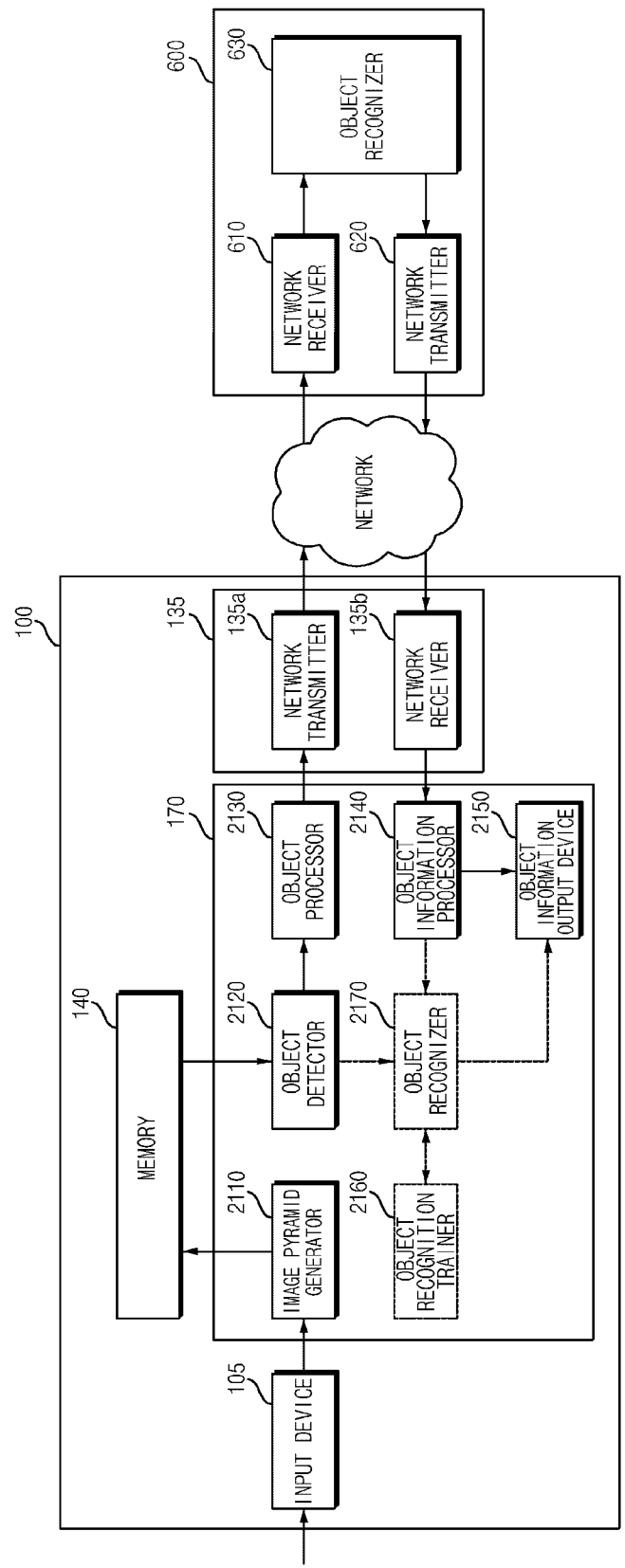

IMAGE DISPLAY APPARATUS WITH AI-BASED IMAGE PROCESSING

CROSS REFERENCE TO RELATED APPLICATIONS

This application is the National Phase of PCT International Application No. PCT/KR2020/004162, filed on Mar. 27, 2020, which claims priority under 35 U.S.C. 119 (a) to Patent Application No. 10-2019-0037434, filed in Republic of Korea on Mar. 29, 2019, all of these applications being hereby expressly incorporated by reference into the present application.

BACKGROUND OF THE INVENTION

1. Field of the Invention

The present disclosure relates to an image display apparatus, and more particularly to an image display apparatus capable of operating based on artificial intelligence (AI).

2. Description of the Related Art

An image display apparatus is an apparatus for displaying images.

For example, the image display apparatus may receive a broadcast signal, an HDMI signal, or the like, and may perform signal processing based on the broadcast signal or the HDMI signal and output the processed image signal.

Meanwhile, the existing image display apparatus mainly receives video and audio signals and outputs the signals after performing signal processing.

Meanwhile, there is a recently developed technology for speech recognition, voiceprint recognition, and the like using a speaker that operates based on AI, and in this respect, research is underway to apply the AI technology to the image display apparatus.

SUMMARY OF THE INVENTION

It is an object of the present disclosure to provide an image display apparatus capable of operating based on AI.

It is another object of the present disclosure to provide an image display apparatus capable of performing image quality processing based on AI.

It is yet another object of the present disclosure to provide an image display apparatus capable of performing audio processing based on AI.

It is still another object of the present disclosure to provide an image display apparatus capable of performing data processing based on AI.

It is still another object of the present disclosure to provide an image display apparatus capable of collecting user information based on AI.

It is still another object of the present disclosure to provide an image display apparatus capable of recommending content or programs suitable for users based on AI.

In accordance with an aspect of the present disclosure, the above and other objects can be accomplished by providing an image display apparatus including: a signal processor configured to perform image processing of an input image, and audio processing of audio corresponding to the input image; a virtual sensor device configured to receive image and audio information processed by the signal processor; a sensor device configured to collect externally captured image information or sound information; and an artificial intelligence (AI) processor configured to perform the image processing of the input image or the audio processing based on AI using the image and audio information from the virtual sensor device, and the image or sound information from the sensor device.

Meanwhile, the signal processor may process data associated with the input image; the virtual sensor device may receive data information processed by the signal processor; and the AI processor may perform the image processing of the input image or the audio processing based on AI using the data information, the image and audio information from the virtual sensor device, and the image or sound information from the sensor device.

Meanwhile, the signal processor may receive a user input signal from a remote controller; the sensor device may collect information on the user input signal; and the AI processor may perform the image processing of the input image or the audio processing based on AI using the information on the user input signal, the image and audio information from the virtual sensor device, and the image or sound information from the sensor device.

Meanwhile, the sensor device may collect viewing environment information based on illumination information from an illumination sensor and motion information from a motion sensor; and the AI processor may perform the image processing of the input image or the audio processing based on AI using the viewing environment information, the image and audio information from the virtual sensor device, and the image or sound information from the sensor device.

Meanwhile, the sensor device may collect externally captured image information from a camera, and may collect external sound information from a microphone.

Meanwhile, the viewing environment information may comprise at least one of screen brightness information and viewing concentration information.

Meanwhile, the signal processor may comprise an image quality processor configured to perform image quality processing, wherein the image quality processor may perform image quality processing according to an image quality set by the AI processor, based on the image information from the virtual sensor device, and the image information from the sensor device.

Meanwhile, based on an image type of the input image and viewing environment information related to a viewer, the signal processor may perform the image quality processing according to the image quality set by the AI processor.

Meanwhile, based on on-time information of the image display apparatus, channel information, video genre information, and image quality setting information according to illumination, the signal processor may perform the image quality processing according to the image quality set by the AI processor.

Meanwhile, the signal processor may comprise an audio processor configured to perform audio processing, wherein based on the audio information from the virtual sensor device and the sound information from the sensor device, the audio processor may perform the audio processing according to a sound quality set by the AI processor.

Meanwhile, based on an audio type of the audio corresponding to the input image, and the viewing environment information related to the viewer, the signal processor may perform the audio processing according to the sound quality set by the AI processor.

Meanwhile, based on on-time information of the image display apparatus, channel information, video genre information, and volume setting information in response to ambient noise, the signal processor may perform the audio processing according to the sound quality set by the AI processor.

Meanwhile, the image display apparatus may further comprise a remote controller including a volume control key, an image quality control key, and a channel control key.

Based on at least one of brightness, contrast, sharpness, and chroma information set by the image quality control key, the signal processor may perform the image quality processing according to the image quality set by the AI processor.

Meanwhile, based on viewer position information which is calculated using image information captured by the sensor device, the signal processor may perform the image quality processing according to the image quality set by the AI processor.

Meanwhile, based on the viewer position information which is calculated using the image information captured by the sensor device, the signal processor may perform the audio processing according to the sound quality set by the AI processor.

Meanwhile, the signal processor may comprise: an object detector configured to detect an object in the input image; an object recognition trainer configured to perform training for object recognition; and an object recognizer configured to recognize an object based on information from the object recognition trainer and the detected object.

Meanwhile, the signal processor may further comprise an object information processor configured to process object recognition information from an external source.

Meanwhile, the object recognizer may recognize an object based on information from the object recognition trainer, the detected object, and the object recognition information received from the external source.

Meanwhile, the signal processor may comprise: a region extractor configured to extract a text region in the input image; a text converter configured to convert the extracted text region into text; an information extractor configured to extract information from the converted text; and a genre analyzer configured to analyze a genre of the extracted information.

Effects of the Invention

An image display apparatus according to an embodiment of the present disclosure comprises: a signal processor configured to perform image processing of an input image, and audio processing of audio corresponding to the input image; a virtual sensor device configured to receive image and audio information processed by the signal processor; a sensor device configured to collect externally captured image information or sound information; and an artificial intelligence (AI) processor configured to perform the image processing of the input image or the audio processing based on AI using the image and audio information from the virtual sensor device, and the image or sound information from the sensor device. Accordingly, the image display apparatus may operate based on AI. Particularly, the image display apparatus may perform image quality processing based on AI.

Meanwhile, the signal processor may process data associated with the input image; the virtual sensor device may receive data information processed by the signal processor; and the AI processor may perform the image processing of the input image or the audio processing based on AI using the data information, the image and audio information from the virtual sensor device, and the image or sound information from the sensor device. Accordingly, image processing or audio processing may be performed based on AI.

Meanwhile, the signal processor may receive a user input signal from a remote controller; the sensor device may collect information on the user input signal; and the AI processor may perform the image processing of the input image or the audio processing based on AI using the information on the user input signal, the image and audio information from the virtual sensor device, and the image or sound information from the sensor device. Accordingly, image processing or audio processing may be performed based on AI.

Meanwhile, the sensor device may collect viewing environment information based on illumination information from an illumination sensor and motion information from a motion sensor; and the AI processor may perform the image processing of the input image or the audio processing based on AI using the viewing environment information, the image and audio information from the virtual sensor device, and the image or sound information from the sensor device. Accordingly, image processing or audio processing may be performed based on AI.

Meanwhile, the sensor device may collect externally captured image information from a camera, and may collect external sound information from a microphone. Accordingly, audio processing may be performed based on AI.

Meanwhile, the viewing environment information may comprise at least one of screen brightness information and viewing concentration information. Accordingly, image processing may be performed based on AI.

Meanwhile, the signal processor may comprise an image quality processor configured to perform image quality processing, wherein the image quality processor may perform the image quality processing according to an image quality set by the AI processor, based on the image information from the virtual sensor device, and the image information from the sensor device. Accordingly, image quality processing may be performed based on AI.

Meanwhile, based on an image type of the input image and viewing environment information related to a viewer, the signal processor may perform the image quality processing according to the image quality set by the AI processor. Accordingly, image quality processing may be performed based on AI.

Meanwhile, based on on-time information of the image display apparatus, channel information, video genre information, and image quality setting information according to illumination, the signal processor may perform the image quality processing according to the image quality set by the AI processor. Accordingly, image quality processing may be performed based on AI.

Meanwhile, the signal processor may comprise an audio processor configured to perform audio processing, wherein based on the audio information from the virtual sensor device and the sound information from the sensor device, the audio processor may perform the audio processing according to a sound quality set by the AI processor. Accordingly, audio processing may be performed based on AI.

Meanwhile, based on an audio type of the audio corresponding to the input image, and the viewing environment information related to the viewer, the signal processor may perform the audio processing according to the sound quality set by the AI processor. Accordingly, audio processing may be performed based on AI.

Meanwhile, based on on-time information of the image display apparatus, channel information, video genre information, and volume setting information in response to ambient noise, the signal processor may perform the audio processing according to the sound quality set by the AI processor. Accordingly, audio processing may be performed based on AI.

Meanwhile, the image display apparatus may further comprise a remote controller including a volume control key, an image quality control key, and a channel control key. Accordingly, image quality processing may be performed based on AI.

Based on at least one of brightness, contrast, sharpness, and chroma information set by the image quality control key, the signal processor may perform the image quality processing according to the image quality set by the AI processor.

Meanwhile, based on viewer position information which is calculated using image information captured by the sensor device, the signal processor may perform the image quality processing according to the image quality set by the AI processor. Accordingly, image quality processing may be performed based on AI.

Meanwhile, based on the viewer position information which is calculated using the image information captured by the sensor device, the signal processor may perform the audio processing according to the sound quality set by the AI processor. Accordingly, audio processing may be performed based on AI.

Meanwhile, the signal processor may comprise: an object detector configured to detect an object in the input image; an object recognition trainer configured to perform training for object recognition; and an object recognizer configured to recognize an object based on information from the object recognition trainer and the detected object. Accordingly, object recognition may be performed based on AI.

Meanwhile, the signal processor may further comprise an object information processor configured to process object recognition information from an external source. Accordingly, object recognition may be performed based on information from an external server.

Meanwhile, the object recognizer may recognize an object based on information from the object recognition trainer, the detected object, and the object recognition information received from the external source. Accordingly, object recognition may be performed based on AI.

Meanwhile, the signal processor may comprise: a region extractor configured to extract a text region in the input image; a text converter configured to convert the extracted text region into text; an information extractor configured to extract information from the converted text; and a genre analyzer configured to analyze a genre of the extracted information. Accordingly, text conversion may be performed based on AI.

BRIEF DESCRIPTION OF THE DRAWINGS

FIGS. 11A and 11B are diagrams referred to in the description of operation of the signal processing apparatus of FIG. 8 or FIG. 9;

FIGS. 13 to 15C are diagrams referred to in the description of operation of FIG. 12;

FIGS. 18 to 20 are diagrams referred to in the description of the operating method of FIG. 17;

FIG. 21 is an example of an internal block diagram of an image display apparatus according to another embodiment of the present disclosure;

DETAILED DESCRIPTION OF THE PREFERRED EMBODIMENTS

Hereinafter, the present disclosure will be described in further detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
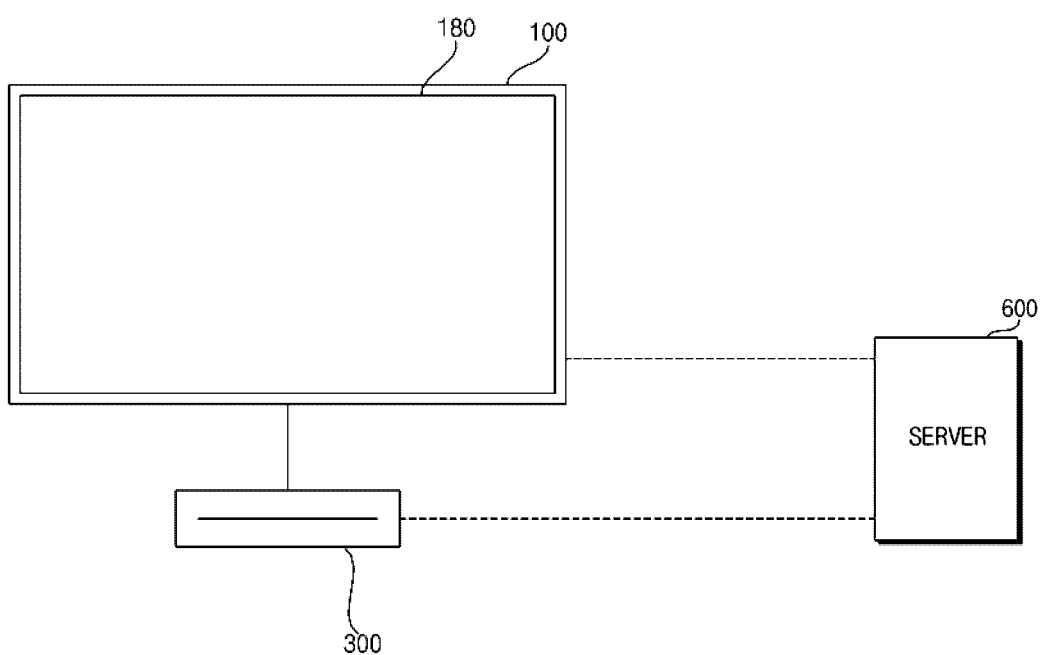
FIG. 1 is a diagram illustrating an image display system according to an embodiment of the present disclosure.

FIG. 1 is a diagram illustrating an image display system according to an embodiment of the present disclosure.

Referring to the drawing, the image display system 10 according to an embodiment of the present disclosure may comprise an image display apparatus 100 including a display 180, a set-top box 300, and a server 600.

The image display apparatus 100 according to an embodiment of the present disclosure may receive images from the set-top box 300 or the server 600.

For example, the image display apparatus 100 may receive an image signal from the set-top box 300 through an HDMI terminal.

In another example, the image display apparatus 100 may receive an image signal from the server 600 through a network terminal.

Meanwhile, the image display apparatus 100 may calculate an original quality of an image signal received from an external set-top box 300 or through a network, may set an image quality of the image signal according to the calculated original quality, and may perform image processing for processing an image quality of the image signal according to the set image quality.

Meanwhile, the image display apparatus 100 may comprise the display 180.

Meanwhile, the display 180 may be implemented with any one of various panels. For example, the display 180 may be any one of a liquid crystal display (LCD) panel, an organic light emitting diode (OLED) panel, an inorganic light emitting diode (LED) panel, and the like.

The following description will be made based on an example in which the display 180 includes the organic light emitting diode (OLED) panel.

Meanwhile, the organic light emitting diode (OLED) panel has advantages in that the OLED panel has a faster response speed than that of LCD, has an excellent color reproduction effect with high color reproduction qualities.

Accordingly, when the display 180 includes an organic light emitting panel, it is desirable that a signal processor 170 (see FIG. 2) in the image display apparatus 100 performs image quality processing corresponding to characteristics of the organic light emitting panel.

Meanwhile, the image display apparatus 100 shown in FIG. 1 may be a TV, a monitor, a tablet PC, a mobile device, etc.

Figure 2:
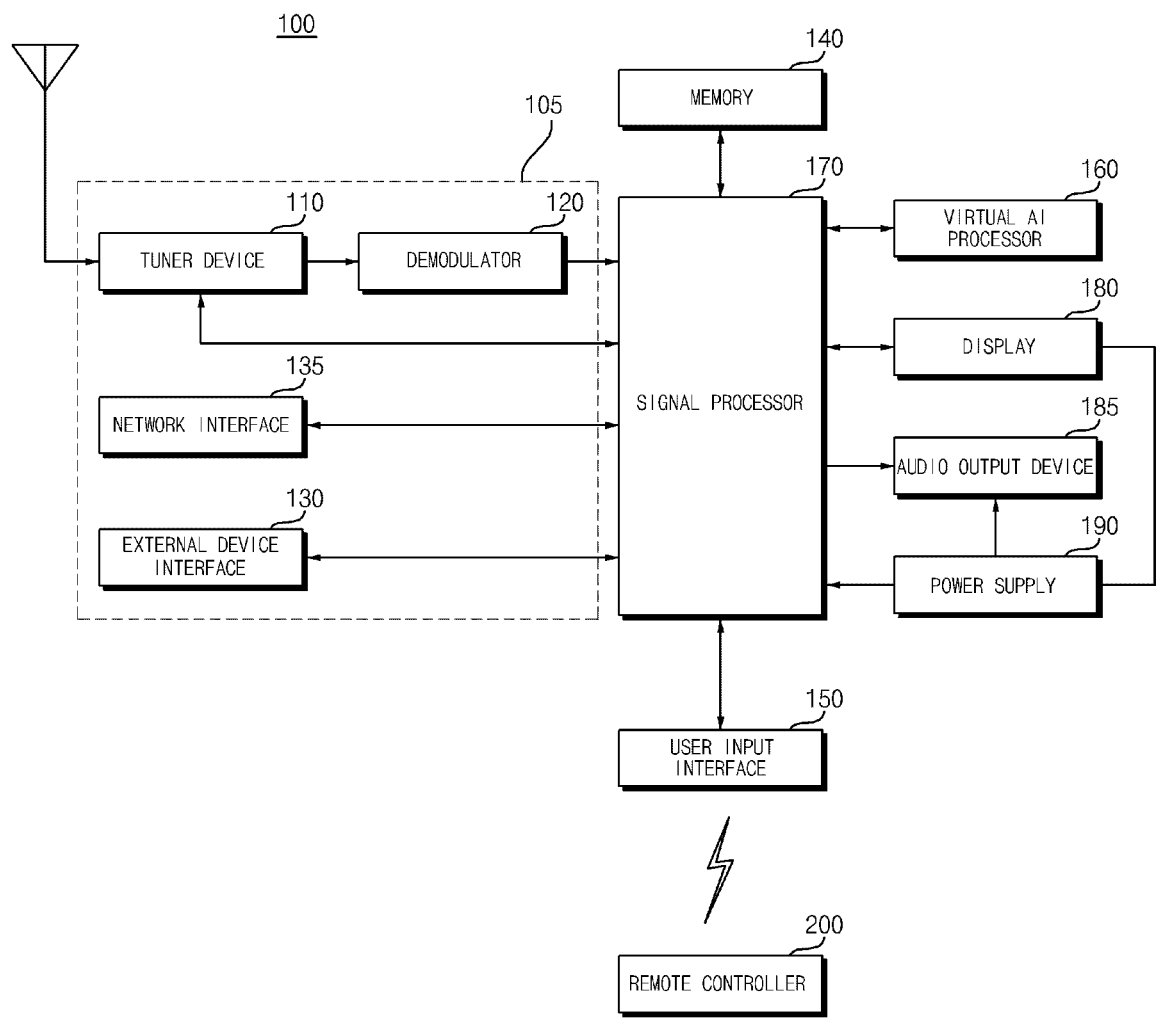
FIG. 2 is an example of an internal block diagram of an image display apparatus of FIG. 1.

FIG. 2 is a block diagram of the image display apparatus shown in FIG. 1.

Referring to FIG. 2, the image display apparatus 100 according to an embodiment of the present disclosure may comprise an image receiver 105, an external device interface 130, a memory 140, a user input interface 150, a sensor device 1220 (see FIG. 12), a virtual artificial intelligence (AI) processor 160, a signal processor 170, the display 180, and an audio output device 185.

The image receiver 105 may comprise a tuner device 110, a demodulator 120, a network interface 135, and an external device interface 130.

Unlike FIG. 2, the image receiver 105 may comprise only the tuner device 110, the demodulator 120, and the external device interface 130. That is, the image receiver 105 may not include the network interface 135.

The tuner device 110 selects a Radio Frequency (RF) broadcast signal corresponding to a channel selected by a user or an RF broadcast signal corresponding to each of pre-stored channels from among a plurality of RF broadcast signals received through an antenna (not shown). In addition, the tuner device 110 downconverts the selected RF broadcast signal into an Intermediate Frequency (IF) signal or a baseband Audio/Video (A/V) signal.

For example, if the selected RF broadcast signal is a digital broadcast signal, the tuner device 110 downconverts the selected RF broadcast signal into a digital IF signal. On the other hand, if the selected RF broadcast signal is an analog broadcast signal, the tuner device 110 downconverts the selected RF broadcast signal into an analog baseband A/V signal (CVBS/SIF). That is, the tuner device 110 may process a digital broadcast signal or an analog broadcast signal. The analog baseband A/V signal, CVBS/SIF from the tuner device 110 may be provided directly to the signal processor 170.

Meanwhile, the tuner device 110 may comprise a plurality of tuners for receiving broadcast signals of a plurality of channels, or a single tuner for simultaneously receiving broadcast signals of a plurality of channels.

The demodulator 120 receives the digital IF signal from the tuner device 110 and demodulates the digital IF signal.

The demodulator 120 may perform demodulation and channel decoding on the digital IF signal, thereby obtaining a stream signal TS. The stream signal TS may be a signal in which an image signal, an audio signal and/or a data signal are multiplexed.

The stream signal output from the demodulator 120 may be input to the signal processor 170 and then subjected to demultiplexing and A/V signal processing. The signal processor 170 outputs the processed video and audio signals to the display 180 and the audio output device 185, respectively.

The external device interface 130 may transmit and receive data to and from a connected external device (not shown) such as a set-top box. For this purpose, the external device interface 130 may comprise an A/V Input/Output (I/O) device (not shown).

The external device interface 130 may be connected to an external device, wirelessly or by wire, such as a Digital Versatile Disk (DVD) player, a Blu-ray Disk (BD) player, a game console, a camera, a camcorder, a computer (e.g. a laptop computer), or a set-top box. Then, the external device interface 130 may transmit and receive signals to and from the external device.

The A/V input and output device may receive audio and image signals from an external device, and a wireless communicator (not shown) may conduct short-range wireless communication with another electronic device.

The external device interface 130 may exchange data with a nearby mobile terminal 600 through the wireless communicator (not shown). Particularly, the external device interface 130 may receive device information, executed application information, an application image, and so on from the mobile terminal 600 in a mirroring mode.

The network interface 135 serves as an interface between the image display apparatus 100 and a wired/wireless network such as the Internet. For example, the network interface 135 may receive content or data from the Internet or from a Content Provider (CP) or a Network Provider (NP) over a network.

Meanwhile, the network interface 135 may comprise a wireless communicator (not shown).

The memory 140 may store programs necessary for the signal processor 170 to process signals and control, and may also store a signal-processed image, audio, or data signal.

In addition, the memory 140 may also temporarily store an audio, video or data signal received from the external device interface 130. The memory 140 may store information about broadcast channels by the channel-add function.

While the memory 140 is shown in FIG. 2 as configured separately from the signal processor 170, to which the present disclosure is not limited, the memory 140 may be incorporated into the signal processor 170.

The user input interface 150 transmits a signal received from the user to the signal processor 170 or transmits a signal received from the signal processor 170 to the user.

Figure 12:
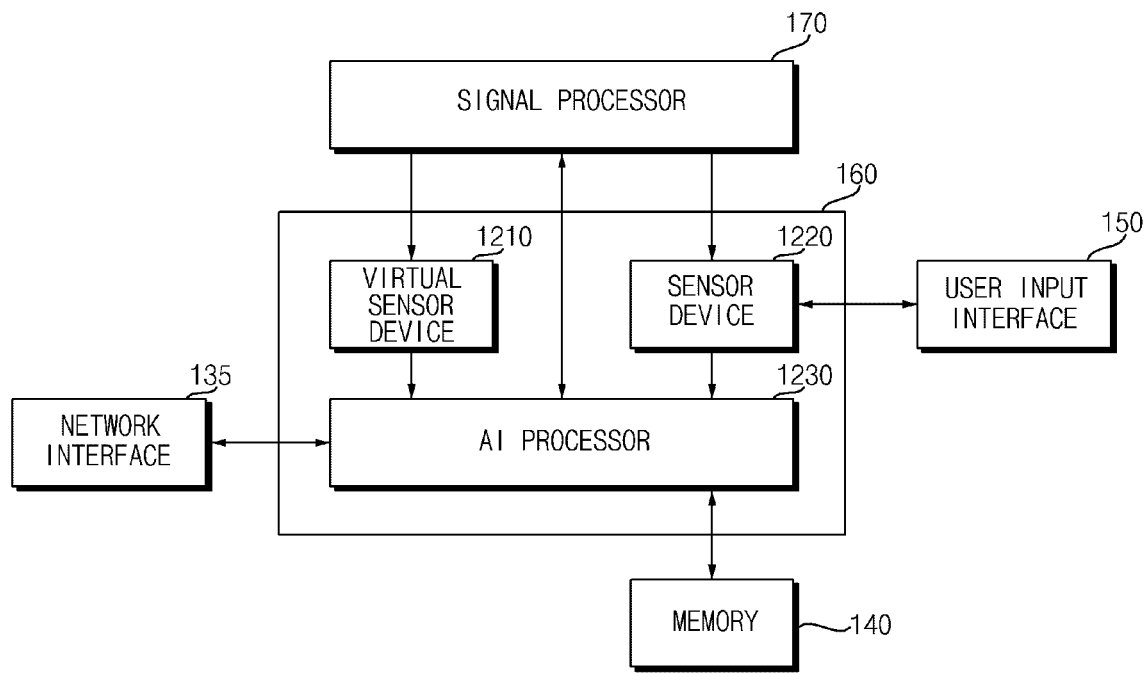
FIG. 12 is an example of an internal block diagram of an image display apparatus according to an embodiment of the present disclosure.

For example, the user input interface 150 may transmit/receive user input signals, such as a power-on/off signal, a channel selection signal, a screen setting signal, etc., to/from a remote controller 200, may provide the signal processor 170 with user input signals received from local keys (not shown), such as inputs of a power key, a channel key, a volume key, and a setting value, transmit a user input signal received from the sensor device 1220 (see FIG. 12) that senses a user gesture to the signal processor 170, or transmit a signal received from the signal processor 170 to the sensor device 1220 (see FIG. 12).

The virtual AI processor 160 may calculate user information, viewing environment information, and the like of the image display apparatus 100 based on the input signal sensed by the sensor device 1220 (see FIG. 12) and the like, and may provide optimal video viewing and audio outputs based on the user information, viewing environment information, and the like.

Meanwhile, the virtual AI processor 160 may perform image quality processing suitable for resolution and noise levels of the received image signal.

For example, even when the resolution of the input image is changed, the virtual AI processor 160 may accurately calculate the original quality of the received image signal by learning using a Deep Neural Network (DNN).

In another example, by updating a parameter for the DNN, the virtual AI processor 160 may accurately calculate the original quality of the image signal based on learning.

In yet another example, the virtual AI processor 160 may improve the accuracy in calculating image type information, and may perform image processing corresponding thereto.

In still another example, the virtual AI processor 160 may recommend content or programs suitable for users based on AI.

The signal processor 170 may demultiplex a stream signal received from the tuner device 110, the demodulator 120, the network interface 135, or the external device interface 130 into a number of signals, and process the demultiplexed signals into audio and image signals.

For example, the signal processor 170 may receive a broadcast signal or an HDMI signal received by the image receiver 105, and output a processed image signal by processing the received broadcast signal or the received HDMI signal.

The image signal processed by the signal processor 170 may be displayed as an image corresponding to the image signal on the display 180. The image signal processed by the signal processor 170 may also be transmitted to an external output device through the external device interface 130.

The audio signal processed by the signal processor 170 may be output to the audio output device 185. Also, the audio signal processed by the signal processor 170 may be transmitted to an external output device through the external device interface 130.

While not shown in FIG. 2, the signal processor 170 may comprise a Demultiplexer (DEMUX) and a video processor, which will be described later with reference to FIG. 3. That is, the signal processor 170 may process various types of signals and accordingly may be implemented in the form of a system On Chip (SOC). It will be described in more detail with reference to FIG. 3.

In addition, the signal processor 170 may provide overall control to the image display apparatus 100. For example, the signal processor 170 may control the tuner device 110 to select an RF broadcast signal corresponding to a user-selected channel or a pre-stored channel.

The signal processor 170 may control the image display apparatus 100 according to a user command received through the user input interface 150 or according to an internal program.

The signal processor 170 may control the display 180 to display an image. The image displayed on the display 180 may be a Two-Dimensional (2D) or Three-Dimensional (3D) still image or video.

The signal processor 170 may control a particular 2D object in the image displayed on the display 180. For example, the particular 2D object may be at least one of a linked Web page (e.g. from a newspaper or a magazine), an Electronic Program Guide (EPG), a menu, a widget, an icon, a still image, a video, or text.

The signal processor 170 may locate the user based on an image captured by a camera device (not shown). For example, the signal processor 170 may determine the distance (a z-axis coordinate) between the user and the image display apparatus 100. In addition, the signal processor 170 may determine x-axis and y-axis coordinates corresponding to the position of the user on the display 180.

The display 180 generates drive signals by converting a processed image signal, a processed data signal, an On Screen Display (OSD) signal, and a control signal received from the signal processor 170 or an image signal, a data signal, and a control signal received from the external device interface 130.

Meanwhile, the display 180 may also be a touch screen that can be used not only as an output device but also as an input device.

The audio output device 185 may receive a processed audio signal from the signal processor 170 and output the received audio signal as voice.

The camera device (not shown) captures a user. The camera device may comprise, but not limited to, a single camera. When needed, the camera device may comprise a plurality of cameras. Image information captured by the camera device may be provided to the signal processor 170.

The signal processor 170 may sense a user's gesture from a captured image received from the camera device (not shown) or from signals received from the sensor device 1220 (see FIG. 12) alone or in combination.

A power supply 190 supplies power across the whole image display apparatus 100. Particularly, the power supply 190 may supply power to the signal processor 170 which may be implemented as a System On Chip (SOC), the display 180 for displaying an image, the audio output device 185 for outputting an audio signal, and so on.

Specifically, the power supply 190 may comprise a converter for converting Alternating Current (AC) power to Direct Current (DC) power, and a DC/DC converter for converting the level of DC power.

The remote controller 200 transmits a user input to the user input interface 150. For the transmission of a user input, the remote controller 200 may operate based on various communication standards such as Bluetooth, RF communication, IR communication, Ultra WideBand (UWB), and ZigBee. In addition, the remote controller 200 may receive an image signal, an audio signal and/or a data signal from the user input interface 150 and may output the received signal as an image or sound.

The above-described image display apparatus 100 may be a fixed or mobile digital broadcast receiver.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present invention, and specific operation and apparatus do not limit the scope of the present invention.

Figure 3:
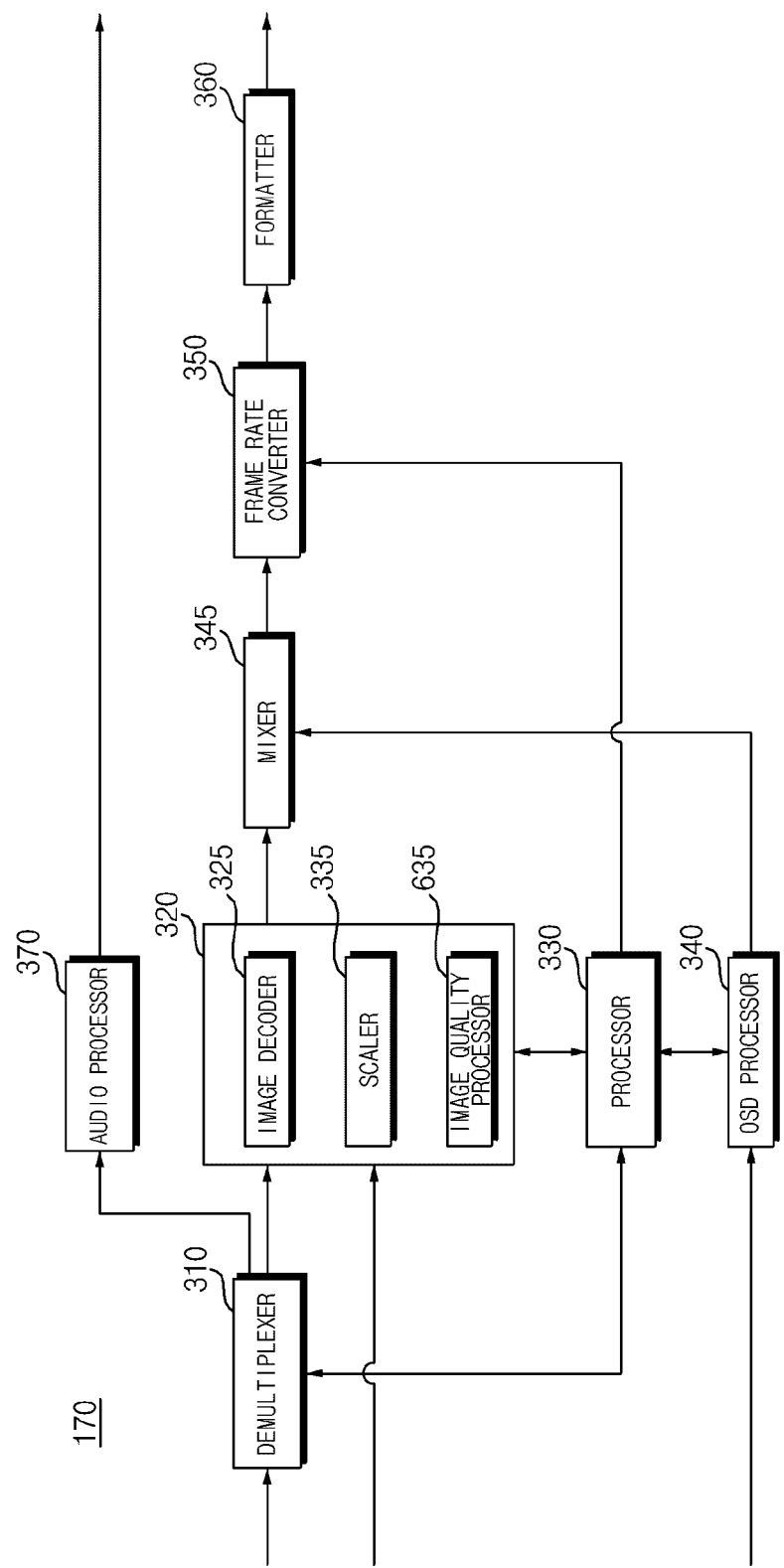
FIG. 3 is an example of an internal block diagram of a signal processor of FIG. 2.

FIG. 3 is a block diagram of the signal processor illustrated in FIG. 2.

Referring to FIG. 3, the signal processor 170 may comprise a DEMUX 310, an image processor 320, a processor 330, and an audio processor 370. The signal processor 170 may further comprise a data processor (not shown).

The DEMUX 310 demultiplexes an input stream. For example, the DEMUX 310 may demultiplex an MPEG-2 TS into an image signal, an audio signal, and a data signal. The input stream signal may be received from the tuner device 110, the demodulator 120, or the external device interface 130.

The image processor 320 may perform signal processing based on a received image. For example, the image processor 320 may perform image processing based on an image signal demultiplexed by the DEMUX 310.

To this end, the image processor 320 may comprise a video decoder 325, a scaler 335, an image quality processor 635, a video encoder (not shown), an OSD processor 340, a Fame Rate Converter (FRC) 350, a formatter 360, etc.

The video decoder 325 decodes the demultiplexed image signal, and the scaler 335 scales resolution of the decoded image signal so that the image signal may be displayed on the display 180.

The video decoder 325 may be provided with decoders that operate in conformance to various standards. For example, the video decoder 325 may comprise, for example, an MPEG-2 decoder, an H.264 decoder, a 3D video decoder for a color image a depth image, a decoder for multi-view images, and so on.

The scaler 335 may scale a received image signal which is decoded by the image decoder 325.

For example, when the size or resolution of a received image signal is small and low, the scaler 335 may upscale the received image signal. When the size or resolution of a received image signal is great and high, the scaler 335 may downscale the received image signal.

The image quality processor 635 may perform image quality processing based on a received image signal which is decoded by the image decoder 325.

For example, the image quality processor 635 may reduce noise of a received image signal, extend grayscale of the received image signal, enhance image resolution, perform High Dynamic Range (HDR)-based signal processing, change a frame rate, or perform image quality processing to corresponding to characteristics of a panel, especially, an organic light emitting panel.

The OSD processor 340 generates an OSD signal autonomously or according to a user input. For example, the OSD processor 340 may generate signals by which a variety of information is displayed as graphics or text on the display 180, according to user input signals. The OSD signal may comprise various data such as a User Interface (UI), a variety of menus, widgets, and icons. The generated OSD signal may comprise a 2D or 3D object.

Further, the OSD processor 340 may generate a pointer to be displayed on the display 180 based on a pointing signal received from the remote controller 200. Especially, the pointer may be generated from a pointing signal processor (not shown), which may reside in the OSD processor 340. Obviously, the pointing signal processor may be configured separately from the OSD processor 240.

The FRC 350 may change the frame rate of the received image signal or simply output the image signal without frame rate conversion.

The formatter 360 may change the format of a received image signal to an image signal to be displayed on the display.

Particularly, the formatter 360 may change the format of a received image signal to correspond to characteristics of a display panel.

Meanwhile, the formatter 360 may change the format of an image signal. For example, the formatter 360 may change the format of a 3D image signal to one of various 3D formats such as a side by side format, a top/down format, a frame sequential format, an interlaced format, and a checker format.

The processor 330 may control overall operations in the image display apparatus 100 or the signal processor 170.

For example, the processor 330 may control the tuner device 110 to tune to an RF broadcast signal corresponding to a user-selected channel or a pre-stored channel.

The processor 330 may control the image display apparatus 100 according to a user command received through the user input interface 150 or according to an internal program.

In addition, the processor 330 may control data transmission through the network interface 135 or the external device interface 130.

In addition, the processor 330 may control operations of the DEMUX 310 and the image processor 320 in the signal processor 170.

The audio processor 370 of the signal processor 170 may process the demultiplexed audio signal. For the audio signal processing, the audio processor 370 may have a plurality of decoders.

The audio processor 370 of the signal processor 170 may also adjust the bass, treble, and volume of the audio signal.

The data processor (not shown) of the signal processor 170 may process the data signal obtained by demultiplexing the input stream signal. For example, if the demultiplexed data signal is a coded data signal, the data processor may decode the coded data signal. The coded data signal may be an EPG which includes broadcasting information specifying the start time, end time, and the like of a scheduled broadcast program of each channel.

Meanwhile, the block diagram of the signal processor 170 illustrated in FIG. 3 is purely exemplary. Depending upon the specifications of the signal processor 170 in actual implementation, the components of the signal processor 170 may be combined or omitted or new components may be added.

In particular, the FRC 350 and the formatter 360 may be provided separately from the image processor 320.

Figure 4A:
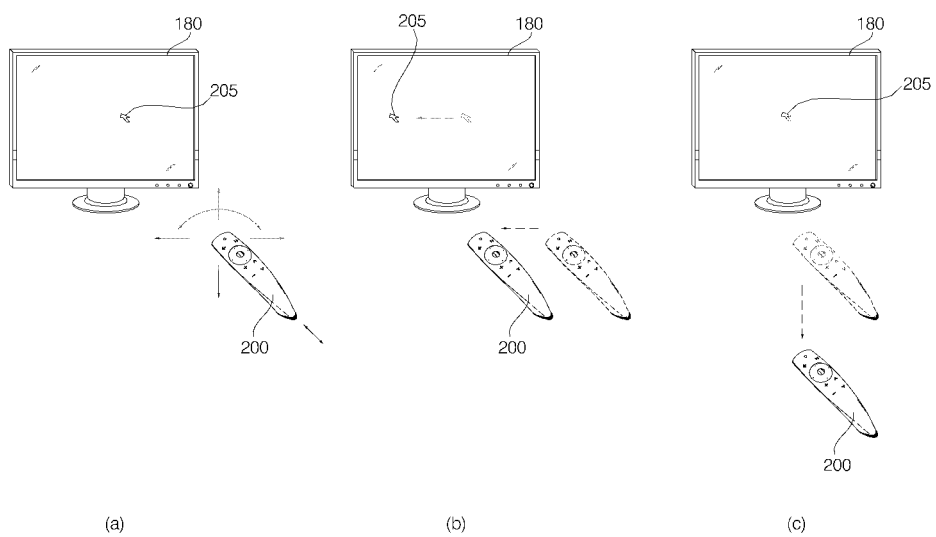
FIG. 4A is a diagram illustrating a method for controlling a remote controller illustrated in FIG. 2.

FIG. 4A is a diagram illustrating a method for controlling the remote controller illustrated in FIG. 2.

(a) of FIG. 4A illustrates a pointer 205 representing movement of the remote controller 200, displayed on the display 180.

The user may move or rotate the remote controller 200 up and down, side to side ((b) of FIG. 4A), and back and forth ((c) of FIG. 4A). The pointer 205 displayed on the display 180 corresponds to movement of the remote controller 200. Since the pointer 205 moves in accordance with the movement of the remote controller 200 in a 3D space, the remote controller 200 may be referred to as a remote controller 200 or a 3D pointing device.

Referring to (b) of FIG. 4A, if the user moves the remote controller 200 to the left, the pointer 205 moves to the left on the display 180.

A sensor of the remote controller 200 detects the movement of the remote controller 200 and transmits motion information corresponding to the result of the detection to the image display apparatus. Then, the image display apparatus may calculate coordinates of the pointer 205 based on the motion information of the remote controller 200. The image display apparatus then displays the pointer 205 at the calculated coordinates.

Referring to (c) of FIG. 4A, while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. On the other hand, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 4B:
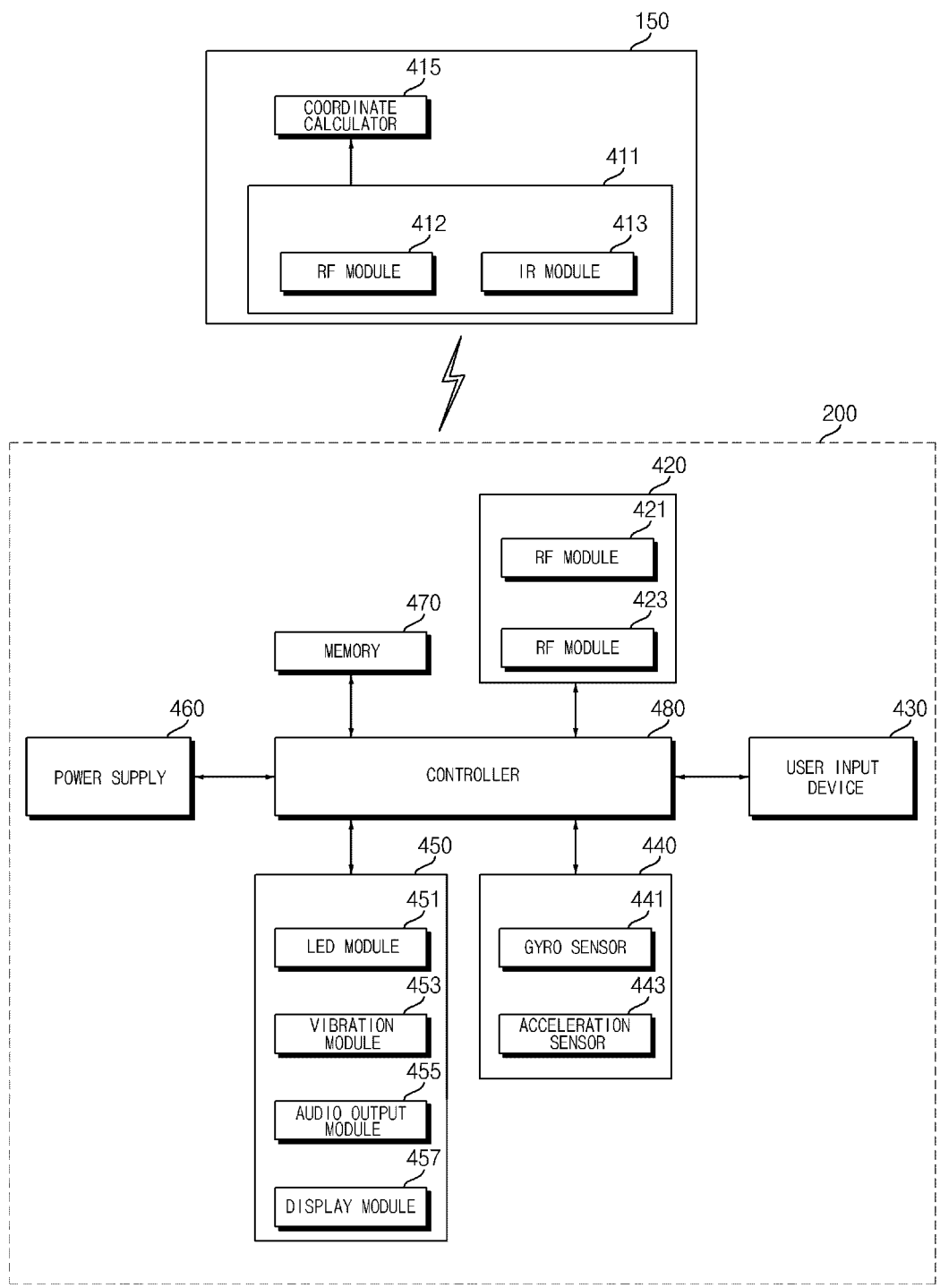
FIG. 4B is an internal block diagram of the remote controller illustrated in FIG. 2.

FIG. 4B is a block diagram of the remote controller illustrated in FIG. 2.

Referring to FIG. 4B, the remote controller 200 may comprise a wireless communicator 425, a user input device 435, a sensor device 440, an output device 450, a power supply 460, a memory 470, and a controller 480.

The wireless communicator 425 transmits signals to and/or receives signals from one of image display apparatuses according to embodiments of the present disclosure. One of the image display apparatuses according to embodiments of the present disclosure, that is, the image display apparatus 100 will be taken as an example.

In this embodiment, the remote controller 200 may comprise an RF module 421 for transmitting RF signals to and/or receiving RF signals from the image display apparatus 100 according to an RF communication standard. Further, the remote controller 200 may comprise an IR module 423 for transmitting IR signals to and/or receiving IR signals from the image display apparatus 100 according to an IR communication standard.

In this embodiment, the remote controller 200 may transmit a signal carrying information about movement of the remote controller 200 to the image display apparatus 100 through the RF module 421.

Further, the remote controller 200 may receive signals from the image display apparatus 100 through the RF module 421. The remote controller 200 may transmit commands, such as a power on/off command, a channel switching command, or a sound volume change command, to the image display apparatus 100 through the IR module 423, as needed.

The user input device 435 may comprise a keypad, a plurality of buttons, a touch pad, or a touch screen. The user may enter commands to the image display apparatus 100 by manipulating the user input device 435. If the user input device 435 includes a plurality of hard-key buttons, the user may input various commands to the image display apparatus 100 by pressing the hard-key buttons. If the user input device 435 includes a touch screen displaying a plurality of soft keys, the user may input various commands to the image display apparatus 100 by touching the soft keys. The user input device 435 may also include various input tools other than those set forth herein, such as a scroll key and/or a jog key, which should not be construed as limiting the present disclosure.

The sensor device 440 may comprise a gyro sensor 441 and/or an acceleration sensor 443. The gyro sensor 441 may sense the movement of the remote controller 200.

For example, the gyro sensor 441 may sense motion information about the remote controller 200 in X-, Y-, and Z-axis directions. The acceleration sensor 443 may sense the moving speed of the remote controller 200. The sensor device 440 may further comprise a distance sensor for sensing the distance between the remote controller 200 and the display 180.

The output device 450 may output a video and/or audio signal corresponding to a manipulation of the user input device 435 or a signal transmitted by the image display apparatus 100. The user may easily identify whether the user input device 435 has been manipulated or whether the image display apparatus 100 has been controlled based on the video and/or audio signal output from the output device 450.

For example, the output device 450 may comprise an LED module 451 which is turned on or off whenever the user input device 435 is manipulated or whenever a signal is received from or transmitted to the image display apparatus 100 through the wireless communicator 425, a vibration module 453 which generates vibrations, an audio output module 455 which outputs audio data, or a display module 457 which outputs an image.

The power supply 460 supplies power to the remote controller 200. If the remote controller 200 is kept stationary for a predetermined time or longer, the power supply 460 may, for example, cut off supply of power to the remote controller 200 in order to save power. The power supply 460 may resume supply of power if a specific key on the remote controller 200 is manipulated.

The memory 470 may store various programs and application data for controlling or operating the remote controller 200. The remote controller 200 may wirelessly transmit signals to and/or receive signals from the image display apparatus 100 in a predetermined frequency band through the RF module 421. The controller 480 of the remote controller 200 may store information regarding the frequency band used for the remote controller 200 to wirelessly transmit signals to and/or wirelessly receive signals from the paired image display apparatus 100 in the memory 470 and may then refer to this information for use at a later time.

The controller 480 provides overall control to the remote controller 200. For example, the controller 480 may transmit a signal corresponding to a key manipulation detected from the user input device 435 or a signal corresponding to motion of the remote controller 200, as sensed by the sensor device 440, to the image display apparatus 100 through the wireless communicator 425.

The user input interface 150 of the image display apparatus 100 may comprise a wireless communication module 411 which wirelessly transmits signals to and/or wirelessly receives signals from the remote controller 200, and a coordinate calculator 415 which calculates coordinates representing the position of the remote controller 200 on the display screen, which is to be moved in accordance with the movement of the remote controller 200.

The user input interface 150 may wirelessly transmit RF signals to and/or wirelessly receive RF signals from the remote controller 200 through an RF module 412. In addition, the user input interface 150 may wirelessly receive IR signals from the remote controller 200 through an IR module 413 according to the IR communication standard.

The coordinate calculator 415 may receive motion information regarding the movement of the remote controller 200 through the wireless communication module 411 and may calculate coordinates (x, y) representing the position of the pointer 205 on a screen of the display 180 by correcting the motion information for possible errors or user hand tremor.

A signal received in the image display apparatus 100 from the remote controller 200 through the user input interface 150 may be transmitted to the signal processor 170. Then, the signal processor 170 may acquire information regarding the movement of the remote controller 200 and information regarding a key manipulation detected from the remote controller 200 from the signal received from the remote controller 200, and may control the image display apparatus 100 based on the acquired information.

In another example, the remote controller 200 may calculate the coordinates of a position to which the pointer is to be shifted in correspondence with its movement and output the coordinates to the user input interface 150 of the image display apparatus 100. In this case, the user input interface 150 may transmit information about the pointer coordinates which was not corrected for possible errors or user hand tremor to the signal processor 170.

In a further example, unlike the configuration of the remote controller 200 illustrated in FIG. 17B, the coordinate calculator 415 may reside in the signal processor 170, instead of the user input interface 150.

Figure 5:
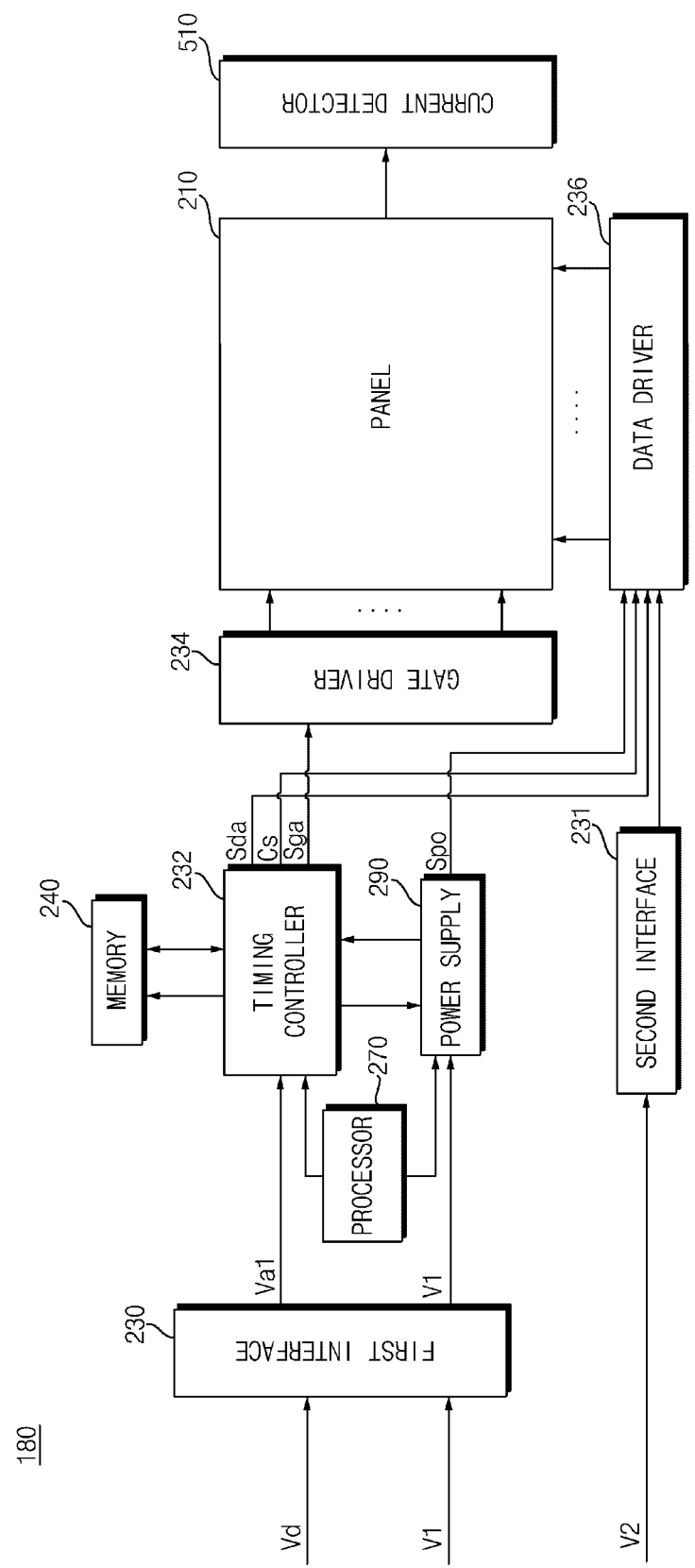
FIG. 5 is an internal block diagram of a display of FIG. 2.

FIG. 5 is a block diagram of the display shown in FIG. 2.

Referring to the drawing, an organic light emitting panel-based display 180 may comprise an organic light emitting display 210, a first interface 230, a second interface 231, a timing controller 232, a gate driver 234, a data driver 236, a memory 240, a processor 270, a power supply 290, a current detector 510, etc.

The display 180 may receive an image signal Vd, a first DC power V1, and a second DC power V2, and display a specific image based on an image signal.

Meanwhile, the first interface 230 of the display 180 may receive the image signal Vd and the first DC power V1 from the signal processor 170.

The first DC power V1 may be used to operate the power supply 290 and the timing controller 230 in the display 180.

The second interface 231 may receive the second DC power V2 from an external power supply 190.

The timing controller 232 may output a data driving signal Sda and a gate driving signal Sga based on the image signal Vd.

For example, when the first interface 230 outputs a converted image signal va1 by converting the received image signal Vd, the timing controller 232 may output the data driving signal Sda and the gate driving signal Sga based on the converted image signal va1.

The timing controller 232 may further receive a control signal and a vertical synchronization signal in addition to the image signal vd from the signal processor 170.

In addition, the timing controller 232 may output a gate driving signal Sga for operating the gate driver 234 and a data driving signal Sda for operating the data driver 236, based on the control signal and the vertical synchronization signal Vsync in addition to the image signal Vd.

In the case where the panel 210 includes RGBW subpixels, the data driving signal Sda may be a data driving signal for operating the RGBW subpixels.

Meanwhile, the timing controller 232 may further output a control signal Cs to the gate driver 234.

In accordance with the gate driving signal Sga and the data driving signal Sda from the timing controller 232, the gate driver 234 and the data driver 236 supply a scan signal and an image signal through gate lines GL and data lines DL, respectively. Accordingly, the organic light emitting panel 210 displays the specific image.

Meanwhile, the organic light emitting panel 210 may comprise an organic light emitting layer, and a plurality of gate lines GL and a plurality of data lines DL may cross each other in a matrix form at each pixel corresponding to the organic light emitting layer.

Meanwhile, the data driver 236 may output a data signal to the organic light emitting panel 210 based on the second DC power V2 from the second interface 231.

The power supply 290 may supply various types of power to the gate driver 234, the data driver 236, the timing controller 232, etc.

The current detector 510 may detect a current flowing in a subpixel of the organic light emitting panel 210. The detected current may be input to the processor 270 or the like to calculate accumulated currents.

The processor 270 may perform various control operations in the display 180. For example, the processor 270 may control the gate driver 234, the data driver 236, the timing controller 232, etc.

Meanwhile, the processor 270 may receive information on a current flowing in a subpixel of the organic light emitting panel 210 from the current detector 510.

In addition, the processor 270 may calculate accumulates currents in a subpixel of the organic light emitting panel 210 based on the information on a current flowing in the subpixel of the organic light emitting panel 210. The calculated value of the accumulated currents may be stored in the memory 240.

Meanwhile, when accumulated currents in a subpixel of the organic light emitting panel 210 is greater than a threshold level, the processor 270 may determine that the subpixel burns-in.

For example, when accumulated currents in a subpixel of the organic light emitting panel 210 are equal to or greater than 300000 A, the processor 270 may determine that the subpixel burns-in.

Meanwhile, when accumulated currents in some of subpixels of the organic light emitting panel 210 are close to a threshold level, the processor 270 may determine that the corresponding subpixels are burn-in expected subpixels.

Meanwhile, based on a current detected by the current detector 510, the processor 270 may determine that a subpixel having the greatest accumulated currents is a burn-in expected subpixel.

Figure 6A:
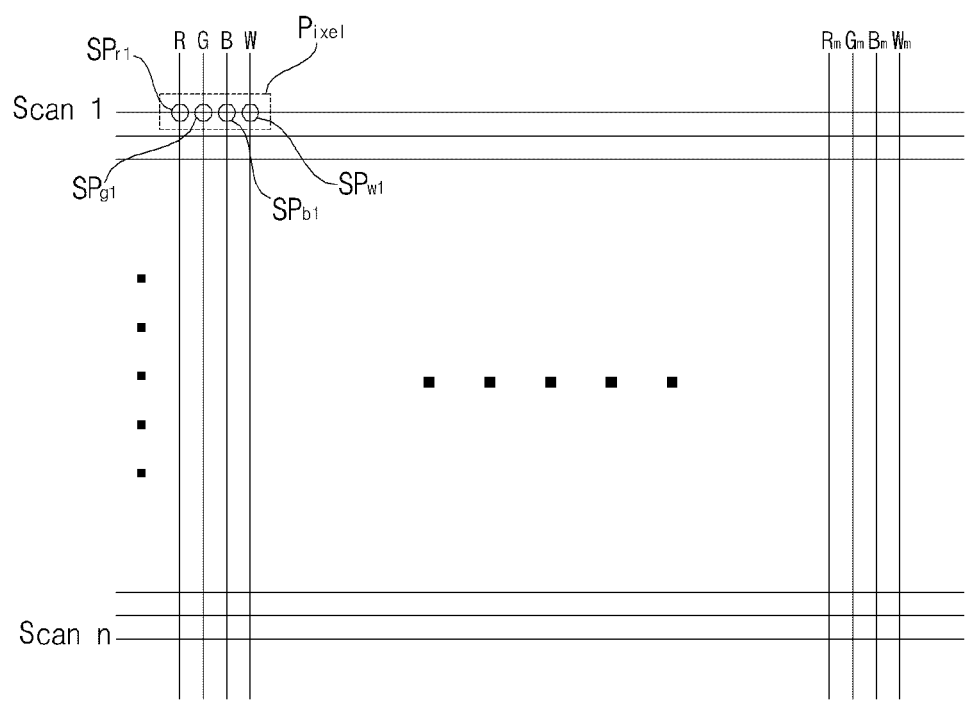
FIG. 6A and FIG. 6B are diagrams referred to in the description of an organic light emitting diode panel of FIG. 5.
Figure 6B:
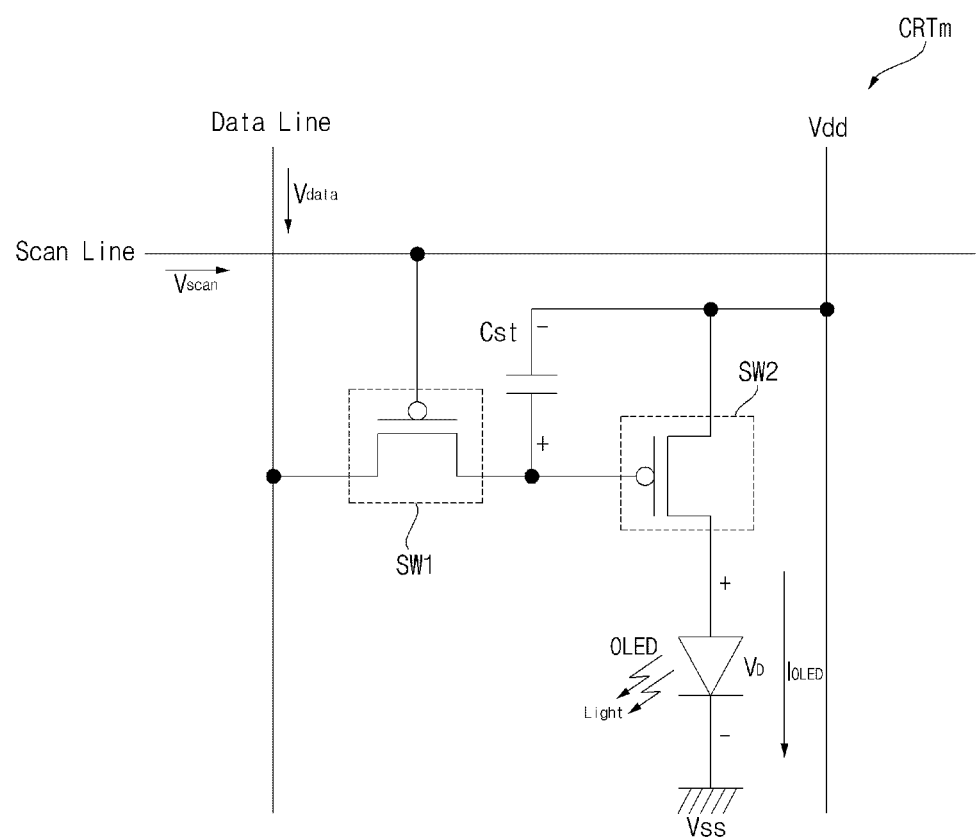

FIGS. 6A and 6B are diagrams referred to in the description of the organic light emitting display panel shown in FIG. 5.

First, FIG. 6A is a diagram illustrating a pixel in the organic light emitting panel 210.

Referring to the drawings, the organic light emitting panel 210 may have a plurality of scan lines Scan 1 to Scan n, and a plurality of data lines R1,G1,B1,W1~Rm,Gm,Bm,Wm intersecting therewith.

Meanwhile, a pixel (sub pixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRTm) may comprise, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

In another example, when the data signal has a different level according to a Plume Amplitude Modulation (PAM) method, the power level stored in the storage capacitor Cst varies according to the level difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may comprise a light emitting layer (EML) of RGBW corresponding to a subpixel, and may comprise at least one of a hole injecting layer (HIL), a hole transporting layer (HTL), an electron transporting layer (ETL), and an electron injecting layer (EIL). In addition, it may comprise a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further comprises green, red, and blue color filters. Meanwhile, since a white subpixel outputs a white light, a separate color filter is not required.

Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Figure 7:
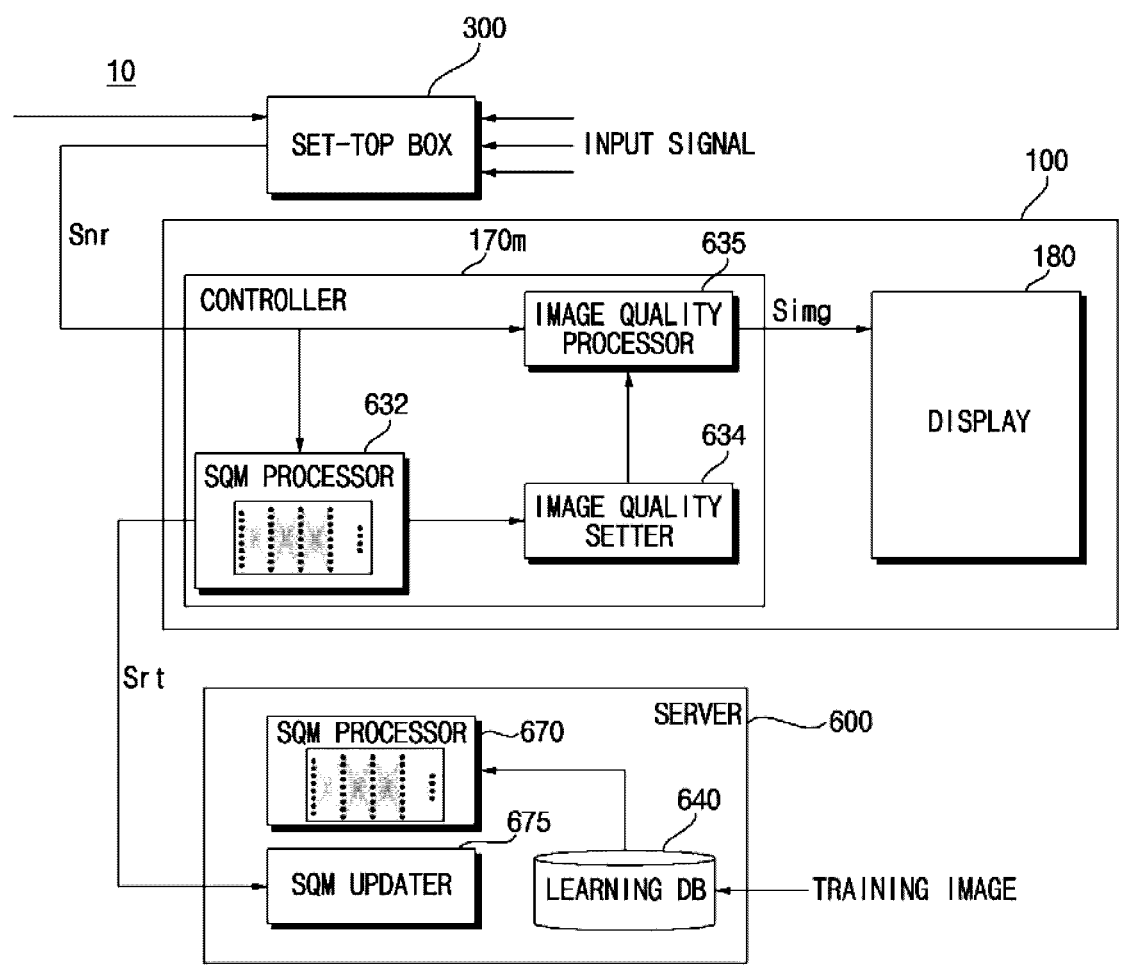
FIG. 7 is an example of an internal block diagram of a signal processing apparatus related to the present disclosure.

FIG. 7 is an example of an internal block diagram of a signal processing apparatus according to an embodiment of the present invention.

Referring to the drawing, an image display system related to the present disclosure may comprise an image display apparatus 100, a server 600, and a set-top box 300.

The server 600 may comprise a learning DB 640 configured to receive a training image and store the received training image, a quality calculator 670 configured to calculate an image source quality using the training image from the learning DB 6400 and a Deep Neural Network (DNN), and an parameter updater 675 configured to update a parameter for the DNN based on the learning DB 640 and the quality calculator 670.

The parameter updater 675 may transmit the updated parameter to a quality calculator 632 of the image display apparatus 100.

The set-top box 300 may receive an input signal from an image provider, and transmit the image signal to an HDMI terminal of the image display apparatus 100.

The image display apparatus 100 may comprise an image receiver 105 configured to receive an image signal via an external set-top box 300 or a network, a signal processor 170m configured to perform signal processing on the image signal received by the image receiver 105, and a display 180 configured to display an image processed by the signal processor 170m.

Meanwhile, the signal processor 170m may comprise: the quality calculator 632 configured to calculate image type information of the input image, an image quality setter 634 configured to set the quality of the image based on the image type information, and an image quality processor 635 configured to perform image quality processing according to the set quality.

Particularly, as the quality calculator 632 in the signal processor 170m calculates resolution information of the input image and the like, the image quality setter 634 may set an image quality corresponding to the input image, and the image quality processor 635 may perform image quality processing according to the set image quality, thereby performing image quality processing corresponding to the input image.

Meanwhile, the signal processor 170m in the image display apparatus 100 of FIG. 7 has a limitation in that it is not easy to adaptively update an algorithm due to a trend change of the original image, for example, a change such as a gradual increase of 2K images or 4K images or an increased use of stream images rather than broadcast images, and the like.

Meanwhile, the quality calculator 632 in the signal processor 170m of the image display apparatus 100 may process a deep learning algorithm.

In this case, the deep learning algorithm is divided into a training process for obtaining a synapse weight value in a pre-defined network structure by using several training data, and an inference process of applying a result thereof.

Meanwhile, during the training process, an input and an answer corresponding thereto should be known, a large amount of data should be processed during an initial training in order to guarantee performance, it takes a long training time from an initial parameter set to convergence, and a large amount of calculations and memories are required.

Accordingly, as illustrated in FIG. 7, the training process is performed in the server 500, and the image display apparatus 100 receives and uses the inference result calculated by the server 500.

Meanwhile, the signal processor 170m in the image display apparatus 100 of FIG. 7 has a limitation in that only the inference is performed using the quality calculator 632, such that performance may not be improved if the image display apparatus 100 receives no update service through the server 600 and the like.

Accordingly, the present disclosure provides a method of calculating an image quality based on artificial intelligence (AI) by allowing the image display apparatus 100 to continuously learn by itself to improve its performance.

Further, rather than decoded images, bit stream images are input recently such that original images of the input images have more various resolutions from low to high than before, in which resized input images may be generated, and the same image of various resolutions may be acquired by using an image retrieval function through a web browser and the like, thereby obtaining resolution information corresponding to the input image.

Accordingly, the present disclosure provides a method of improving its own performance of calculating an image quality by transmitting image resolution information together or providing the input image at a lower resolution.

Further, the present disclosure provides a technique for applying a refined training process in order to further improve performance after the initial training process, which will be described below with reference to FIG. 8 and the following figures.

Figure 8:
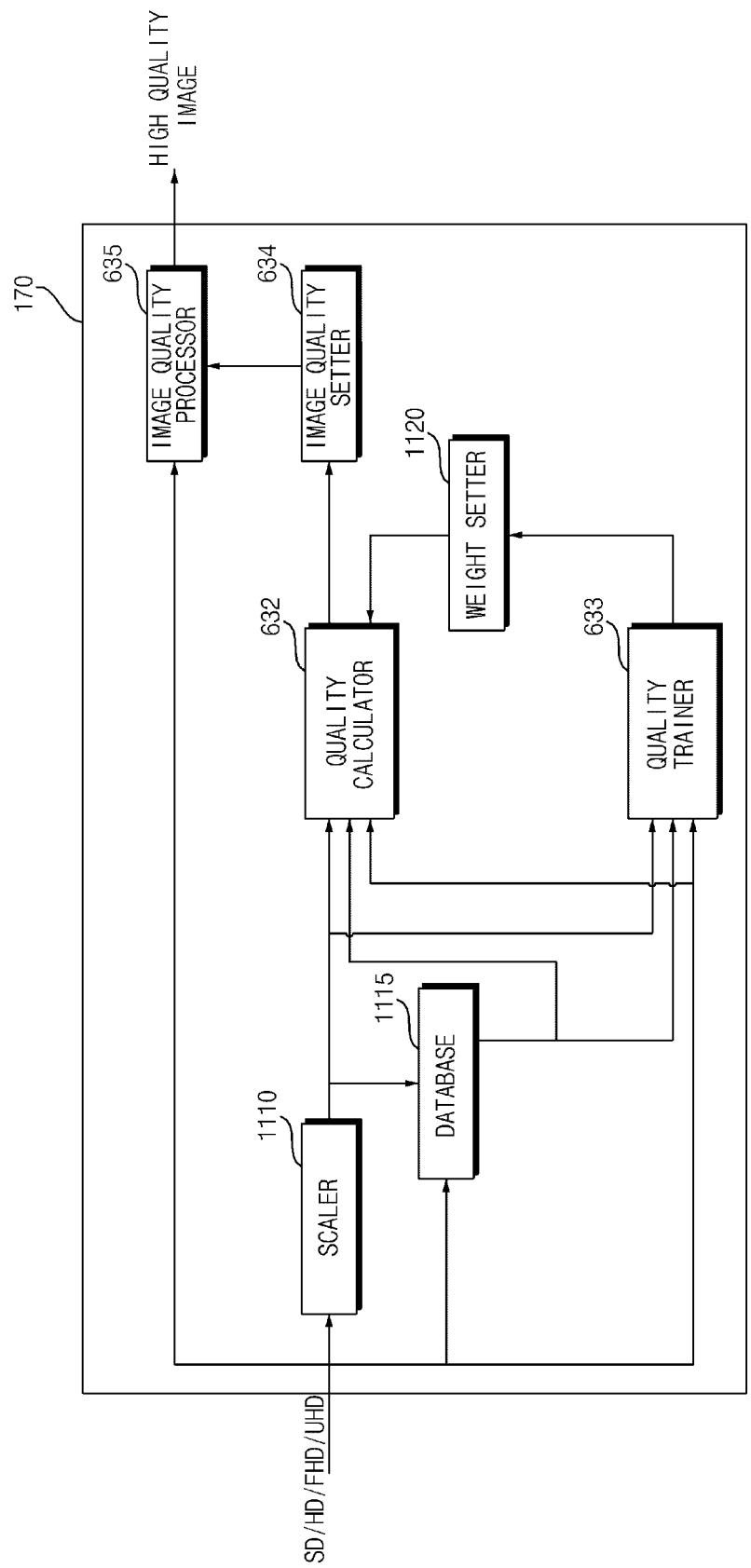
FIG. 8 is an example of an internal block diagram of a signal processing apparatus according to an embodiment of the present disclosure.

FIG. 8 is an example of an internal block diagram of a signal processing apparatus according to an embodiment of the present disclosure.

Referring to the drawing, the signal processor 170 according to an embodiment of the present disclosure may comprise a quality calculator 632 configured to calculate image type information of the input image, an image quality setter 634 configured to set an image quality based on the image type, an image quality processor 635 configured to perform image quality processing according to the set quality, and a quality trainer 633, which if a level of the image type information of the input image is lower than or equal to a reference level, of if a difference between the input image type information and the calculated image type information of the input image is greater than or equal to a predetermined value, configured to perform quality training based on at least a partial region of the input image.

Meanwhile, the quality calculator 632 may calculate the image type information of the input image based on a result of the quality training of the quality trainer 633. Accordingly, it is possible to improve the accuracy of image analysis and to perform image processing corresponding thereto. Particularly, it is possible to improve the accuracy of quality calculation based on the training result of the quality trainer 633.

Meanwhile, the signal processor 170 may further comprise a weight setter 1120 configured to set a weight corresponding to the training result of the quality trainer 633.

Meanwhile, the weight setter 1120 may transmit an updated weight or an updated parameter to the quality calculator 632.

Accordingly, the quality calculator 632 may calculate the image type information of the input image according to the weight set by the weight setter 1120. Accordingly, it is possible to improve the accuracy of image analysis and to perform image processing corresponding thereto. Particularly, it is possible to improve the accuracy of quality calculation based on the weight set by the weight setter 1120.

Meanwhile, the quality calculator 632 may calculate probabilities of a plurality of image types, and may output a plurality of probability information items.

For example, the quality calculator 632 may calculate resolution information and noise information together, and may calculate first probability information corresponding to good quality information of a 2K resolution associated with the resolution information and noise information, second probability information corresponding to bad quality information of a 2K resolution, third probability information corresponding to good quality information of a 4K resolution, and fourth probability information corresponding to bad quality information of a 4K resolution.

In another example, the quality calculator 632 in the signal processor 170 may calculate only the resolution information, and may calculate and output first probability information corresponding to an HD resolution, second probability information corresponding to an FHD resolution, third probability information corresponding to a 2K resolution, fourth probability information corresponding to a 4K resolution, and fifth probability information corresponding to a 8K resolution.

Meanwhile, if resolution information of the input image is not known, the quality calculator 632 may operate to output the calculated quality information, particularly resolution information.

Meanwhile, if resolution information of the input image is known, the quality calculator 632, as well as the quality trainer 633, may operate.

Further, by using the calculated quality information, which is calculated by the quality calculator 632, or the calculated quality information separately calculated therein, the quality trainer 633 may determine whether a difference between the input image type information and the calculated image type information of the input image is greater than or equal to a predetermined value.

Further, if the difference between the input image type information and the calculated image type information of the input image is greater than or equal to the predetermined value, the quality trainer 633 may perform quality training.

Alternatively, if a level of the image type information of the input image is lower than or equal to a reference level, the quality trainer 633 may perform quality training.

That is, if the level of the image type information of the input image is lower than or equal to the reference level, or the difference between the input image type information and the calculated image type information of the input image is greater than or equal to the predetermined value, the quality trainer 633 may perform quality training. Accordingly, it is possible to improve the accuracy of image analysis and to perform image processing corresponding thereto. Particularly, it is possible to improve the accuracy of quality calculation based on the training result of the quality trainer 633.

Meanwhile, among the output probability information items of the plurality of image types, if a level of maximum probability information is lower than or equal to a reference level, the quality trainer 633 may perform quality training. Accordingly, it is possible to improve the accuracy of image analysis and to perform image processing corresponding thereto.

Meanwhile, the signal processor 170 according to an embodiment of the present disclosure may further comprise a scaler 1110 for scaling the input image to an image at a first resolution.

The scaler 1110 may scale the input image to the image at the first resolution, and may normalize the image.

For example, the scaler 1110 may normalize the input image to an FHD image or a UHD image.

Considering that a widely used resolution in video is FHD or less, an up-scaler may be mainly used as the scaler 1110.

In this case, the scaler 1110 used may have functions of data augmentation, noise addition, rotation, partial enhancement, and the like, in order to further improve performance by modeling a video converter of an external device and data distortion.

Meanwhile, based on the input image scaled to the first resolution by the scaler 1110, and resolution information of the original image, the quality trainer 633 evaluates performance and performs training.

The quality training performed by the quality trainer 633 may be used in a process of storing, in an external memory (e.g., DRAM), a score loss of SoftMax which is calculated by the forward path of an inference module, and all node values in a deep learning structure, and then updating the synapse weight by backward propagation of a Source Resolution Training module.

Meanwhile, in the drawing, the quality calculator 632 and the quality trainer 633 are separated so as to perform inference and training, respectively.

Meanwhile, without immediately applying a new synapse weight value which is updated in the training process of the quality trainer 633, the weight setter 1120 may perform evaluation, and then may replace or update an existing weight set.

Meanwhile, an image of the first resolution may be provided to the quality calculator 632 and the quality trainer 633, thereby reducing the amount of calculation by the quality calculator 632 and the quality trainer 633.

Meanwhile, the signal processor 170 according to an embodiment of the present disclosure may further comprise a database 1115 having a data set including a partial region of the input image and a partial region of a previous input image.

Meanwhile, if a level of the image type information of the input image is lower than or equal to the reference level, or if a difference between the input image type information and the calculated image type information of the input image is greater than or equal to the predetermined value, the quality trainer 633 may perform quality training based on the partial region of the input image included in the database 1115. Accordingly, it is possible to improve the accuracy of image analysis and to perform image quality processing corresponding thereto. In addition, it is possible to reduce an amount of calculation during the quality training.

Meanwhile, the partial region stored in the database 1115 may be updated based on the analysis of the input image. Accordingly, it is possible to improve the accuracy of image analysis and to perform image quality processing corresponding thereto.

Meanwhile, the database 1115 may store a region, having a level of sharpness being greater than or equal to a reference value, in an edge region of the input image, thereby reducing an amount of calculation during image analysis.

Meanwhile, the database 1115 may store training images used for training.

Meanwhile, the quality calculator 632 and the quality trainer 633 may perform quality calculation and quality training, respectively, by using the Deep Neural Network (DNN). Accordingly, it is possible to improve the accuracy of image analysis and to perform image quality processing corresponding thereto.

If a case where the level of the image type information of the input image is lower than or equal to the reference level occurs continuously, the quality trainer 633 may perform quality training based on at least a partial region of the input image. Accordingly, it is possible to improve the accuracy of image analysis and to perform image quality processing corresponding thereto.

Meanwhile, while the image type information of the input image is input, if the difference between the input image type information and the calculated image type information of the input image is greater than or equal to the predetermined value, the equality trainer 633 may perform quality training based on at least a partial region of the input image. Accordingly, it is possible to improve the accuracy of image analysis and to perform image quality processing corresponding thereto.

Meanwhile, the quality trainer 633 may update an internal mathematical model by repeatedly performing forward and backward propagation, and may repeatedly perform forward and backward propagation based on the updated mathematical model. Accordingly, it is possible to improve the accuracy of image analysis and to perform image quality processing corresponding thereto.

Meanwhile, upon receiving a mathematical model from an external source, the quality trainer 633 may initialize the updated mathematical model. Accordingly, it is possible to improve the accuracy of image analysis and to perform image quality processing corresponding thereto.

Meanwhile, the input image may comprise a streaming image, a broadcast image, an image input from an external source, or a web-based image. Accordingly, it is possible to improve the accuracy of image analysis of various input images and to perform image quality processing corresponding thereto.

Meanwhile, the image quality setter 634 may output a noise reduction setting value or a sharpness setting value according to a set image quality. Accordingly, it is possible to improve the accuracy of image analysis and to perform image quality processing corresponding thereto.

Meanwhile, the image type information may comprise resolution information and image quality information. Accordingly, it is possible to perform image quality processing corresponding to the resolution or image quality.

Meanwhile the signal processor 170 may provide optimal tuning according to the quality of the input image.

Meanwhile, the signal processor 170 may analyze an input image in real time to determine an original resolution, a noise level, a compression level, and an enhancement level of the input image.

Meanwhile, the image display apparatus 100 may change an image quality setting based on calculated image information data without causing a sense of discomfort.

For example, if enhancement of the input image is required, the signal processor 170 may adjust an enhancement intensity.

In another example, as there is a difference in texture or thickness of the edge of the input image and in sharpness according to an original resolution, the signal processor 170 may apply different filter sizes during image processing.

Specifically, as the resolution of the input image increases, the signal processor 170 may decrease the filter size.

For example, if a high resolution image is input, the signal processor 170 may decrease the filter size to provide a sharper texture or edge of the original image, and if a low resolution image is input, the signal processor 170 may increase the filter size to improve the image quality for a relatively wider edge and texture.

Meanwhile, the signal processor 170 may comprise the quality calculator 632 configured to calculate an original quality of an image signal received from the external set-top box 300 or a network, an image quality setter 634 configured to set a quality of the image signal according to the calculated original quality, and an image quality processor 635 configured to perform image quality processing on the image signal according to the set image quality.

If original quality of a received image signal is changed at a first point in time, the image quality setter 634 changes an image quality setting from a first setting to a second setting in a sequence and the image quality processor 635 may perform image quality processing according to the sequential change of the first setting to the second setting. Accordingly, it is possible to reduce flicker when the image quality is changed due to the change of the original quality of the received image signal. In particular, when the original quality of the image signal is changed, the quality may be changed smoothly rather than radically.

Meanwhile, if original quality of a received image signal is modified at a first point in time while an image is reproduced, the image quality setter 634 may sequentially change an image quality setting from a first setting to a second setting. Accordingly, when the original quality of the received image signal is changed, it is possible to change the image quality setting in real time. In particular, when the original quality of the image signal is changed, the image quality may be changed smoothly rather than radically.

Meanwhile, if original quality of a received image signal is changed at a first point in time due to a channel change or an input change while the image signal is received from the set-top box 300, the image quality setter 634 change the image quality from a first setting to a second setting in a sequence. Accordingly, it is possible to reduce flicker when the image quality is changed due to the original quality of the received image signal is changed. In particular, when the original quality of the image signal is changed, the image quality may be changed smoothly rather than radically.

The quality calculator 632 may classify an input image as an UHD (3840×2160 or more), FHD (1920×1080), HD (1280×720), or SD (720×480 or less) image.

The quality calculator 632 may calculate a probability for each resolution with respect to an input image, select a resolution having the highest probability as the final resolution and exclude a resolution having a too low probability.

The quality calculator 632 may anticipate a noise level and a compression level in addition to the resolution.

Meanwhile, when calculating the compression level, the quality calculator 632 may determine the compression level based on training data obtained by reducing a compression bit-rate with reference to an original state.

For example, for FHD, the quality calculator 632 may evaluate the current digital TV broadcasting standard as 1.0 and calculate such that the value can be reduced to 0.0 when data be lost as compressed too much.

Meanwhile, the quality calculator 632 may calculate a noise level by measuring a level of flicker in an input image.

For example, the quality calculator 632 may calculate a level of noise in an input image into one of four levels that are high level, medium level, low level, and no-noise level.

Meanwhile, the quality calculator 632 may calculate a resolution and a noise level of a received image signal using a DNN. Accordingly, it is possible to accurately calculate original quality of the received image.

Meanwhile, the quality calculator 632 may update a parameter for the DNN from the server 600, and calculate a resolution and a noise level of a received image signal based on the updated parameter.

Accordingly, it is possible to accurately calculate original quality of an image signal based on learning.

Meanwhile, the quality calculator 632 may extract a first region and a second region from the image signal, and calculate an original resolution of the image signal based on the first region and a noise level of the image signal based on the second region. Accordingly, it is possible to accurately calculate the original quality of the image signal based on extraction of a region suitable for the quality calculation.

Meanwhile, the quality calculator 632 may extract a region having the most edge components in the image signal as a first region, and extract a region having the least edge components in the image signal as a second region. Accordingly, it is possible to accurately calculate the original quality of the image signal based on extraction of a region suitable for the quality calculation.

Meanwhile, the image quality processor 635 may increase the noise reduction processing intensity for an image signal as the calculated noise level increases. Accordingly, it is possible to perform image quality processing appropriate for a noise level of a received image signal.

Meanwhile, the quality calculator 632 may calculate an original resolution, a noise level, and a compression level of a received image signal, and calculate the compression level based on training data obtained by reducing a compression bit rate.

Meanwhile, the image quality processor 635 may decrease the enhancement intensity for the image signal as the higher the calculated compression level increases. Accordingly, it is possible to accurately calculate the compression level.

Meanwhile, the image quality processor 635 may increase the enhancement intensity for the image signal as the original resolution of the image signal increases. Accordingly, it is possible to perform image quality processing appropriate for the original resolution of the received image signal.

Meanwhile, the image quality processor 635 may increase a blurring intensity for the image signal as the calculated compression level increases. Accordingly, it is possible to perform image quality processing appropriate for a compression level of a received image signal.

Meanwhile, the image quality processor 635 may decrease the filter used to filter the image signal as the original resolution of the image signal increases. Accordingly, it is possible to perform image quality processing appropriate for the original resolution of the received image signal.

Meanwhile, the image quality processor 635 may downscale an image signal according to an original resolution of an image signal, perform image quality processing on the downscaled image signal, upscales the image-quality-processed image signal, and output the upscaled image signal. Accordingly, it is possible to perform image quality processing appropriate for the original resolution of the received image signal.

Meanwhile, the interior of the signal processing apparatus of FIG. 8 may be modified variously. Particularly, the quality calculator 632 and the quality trainer 633 of FIG. 8 may be integrated with each other, which will be described below with reference to FIG. 9.

Figure 9:
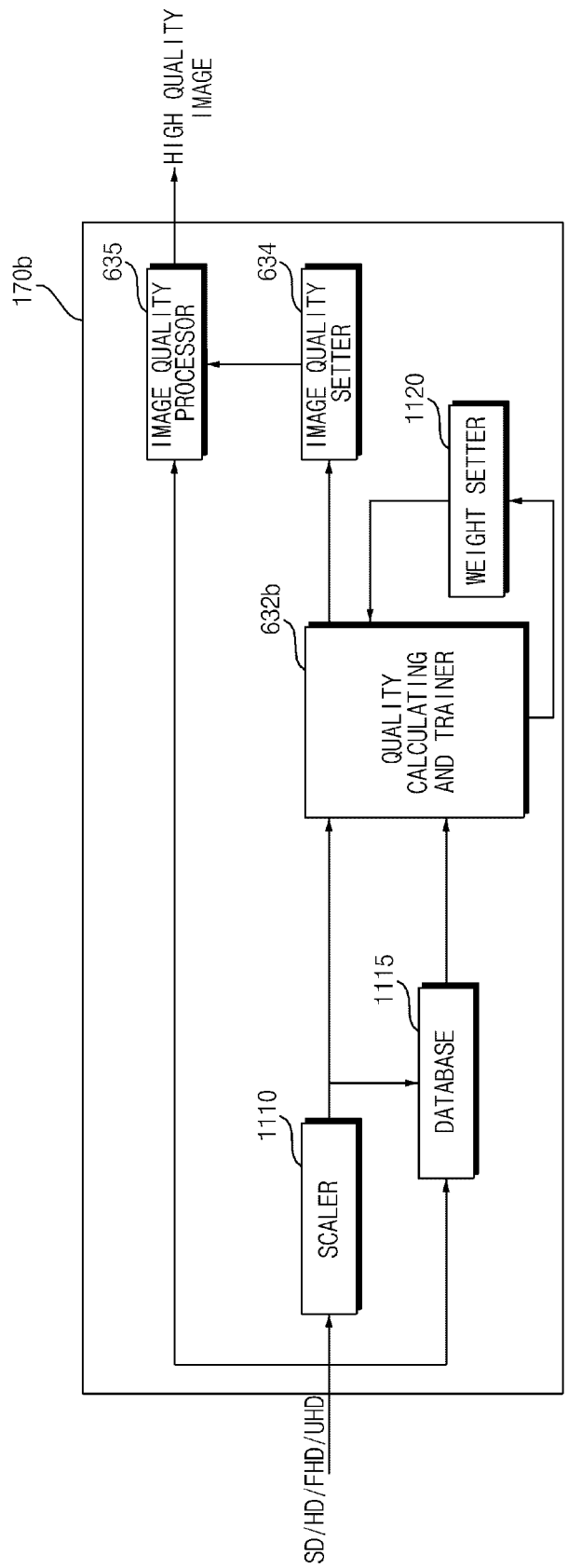
FIG. 9 is another example of an internal block diagram of a signal processing apparatus according to an embodiment of the present disclosure.

FIG. 9 is another example of an internal block diagram of a signal processing apparatus according to an embodiment of the present disclosure.

Referring to the drawing, a signal processor 170*b* according to another embodiment of the present disclosure may comprise, similarly to the signal processor 170 of FIG. 8, an image quality setter 634, an image quality processor 635, a scaler 1110, a database 1115, and a weight setter 1120.

The description of FIG. 8 may correspond to a description of operations of the image quality setter 634, the image quality processor 635, the scaler 1110, the database 1115, and the weight setter 1120 of FIG. 9.

However, the signal processor 170*b* of FIG. 9 may comprise a quality calculating and trainer 632*b* in which the quality calculator 632 and the quality trainer 633 of FIG. 8 are integrated.

The quality calculating and trainer 632b may calculate image type information of the input image, and if a level of the image type information of the input image is lower than or equal to a reference level, or if a difference between the input image type information and the calculated image type information of the input image is greater than or equal to a predetermined value, the quality calculating and trainer 632b may perform quality training based on at least a partial region of the input image.

Further, the quality calculating and trainer 632b may calculate the image type information of the input image based on a result of the training.

Accordingly, it is possible to improve the accuracy of image analysis and to perform image quality processing corresponding thereto. Particularly, it is possible to improve the accuracy of quality calculation based on the training result of the quality trainer 633.

Meanwhile, the quality calculating and trainer 632b may calculate the image type information of the input image according to a weight set by the weight setter 1120. Accordingly, it is possible to improve the accuracy of image analysis and to perform image quality processing corresponding thereto. Particularly, it is possible to improve the accuracy of quality calculation based on the weight set by the weight setter 1120.

Meanwhile, the quality calculating and trainer 632b may calculate probabilities for a plurality of image types and may output a plurality of probability information items. If a level of the image type information of the input image is lower than or equal to a reference level, or if a difference between the input image type information and the calculated image type information of the input image is greater than or equal to a predetermined value, the quality calculating and trainer 632b may perform quality training. Accordingly, it is possible to improve the accuracy of image analysis and to perform image quality processing corresponding thereto. Particularly, it is possible to improve the accuracy of quality calculation based on the training result of the quality calculating and trainer 632b.

Meanwhile, among the output probability information items for the plurality of image types, if a level of maximum probability information is lower than or equal to a reference level, the quality calculating and trainer 632b may perform quality training. Accordingly, it is possible to improve the accuracy of image analysis and to perform image quality processing corresponding thereto.

Meanwhile, if the level of the image type information of the input image is lower than or equal to the reference level, or if the difference between the input image type information and the calculated image type information of the input image is greater than or equal to the predetermined value, the quality calculating and trainer 632b may perform quality training based on a partial region of the input image in the database 1115. Accordingly, it is possible to improve the accuracy of image analysis and to perform image quality processing corresponding thereto. In addition, it is possible to reduce an amount of calculation during quality training.

Meanwhile, the quality calculating and trainer 632b may perform both the quality calculation and quality training by using the DNN. Accordingly, it is possible to improve the accuracy of image analysis and to perform image quality processing corresponding thereto.

Meanwhile, if a case where the level of the image type information of the input image is lower than or equal to the reference level occurs continuously, the quality calculating and trainer 632b may perform quality training based on at least a partial region of the input image. Accordingly, it is possible to improve the accuracy of image analysis and to perform image quality processing corresponding thereto.

Meanwhile, while the image type information of the input image is input, if the difference between the input image type information and the calculated image type information of the input image is greater than or equal to the predetermined value, the quality calculating and trainer 632b may perform quality training based on at least a partial region of the input image. Accordingly, it is possible to improve the accuracy of image analysis and to perform image quality processing corresponding thereto.

Meanwhile, the quality calculating and trainer 632b may update an internal mathematical model by repeatedly performing forward and backward propagation, and may repeatedly perform forward and backward propagation based on the updated mathematical model. Accordingly, it is possible to improve the accuracy of image analysis and to perform image quality processing corresponding thereto.

Meanwhile, upon receiving a mathematical model from an external source, the quality calculating and trainer 632b may initialize the updated mathematical model. Accordingly, it is possible to improve the accuracy of image analysis and to perform image quality processing corresponding thereto.

As described above, by performing inference and training using one module of the deep quality calculating and trainer 632b, a data processing speed may be improved.

Figure 10:
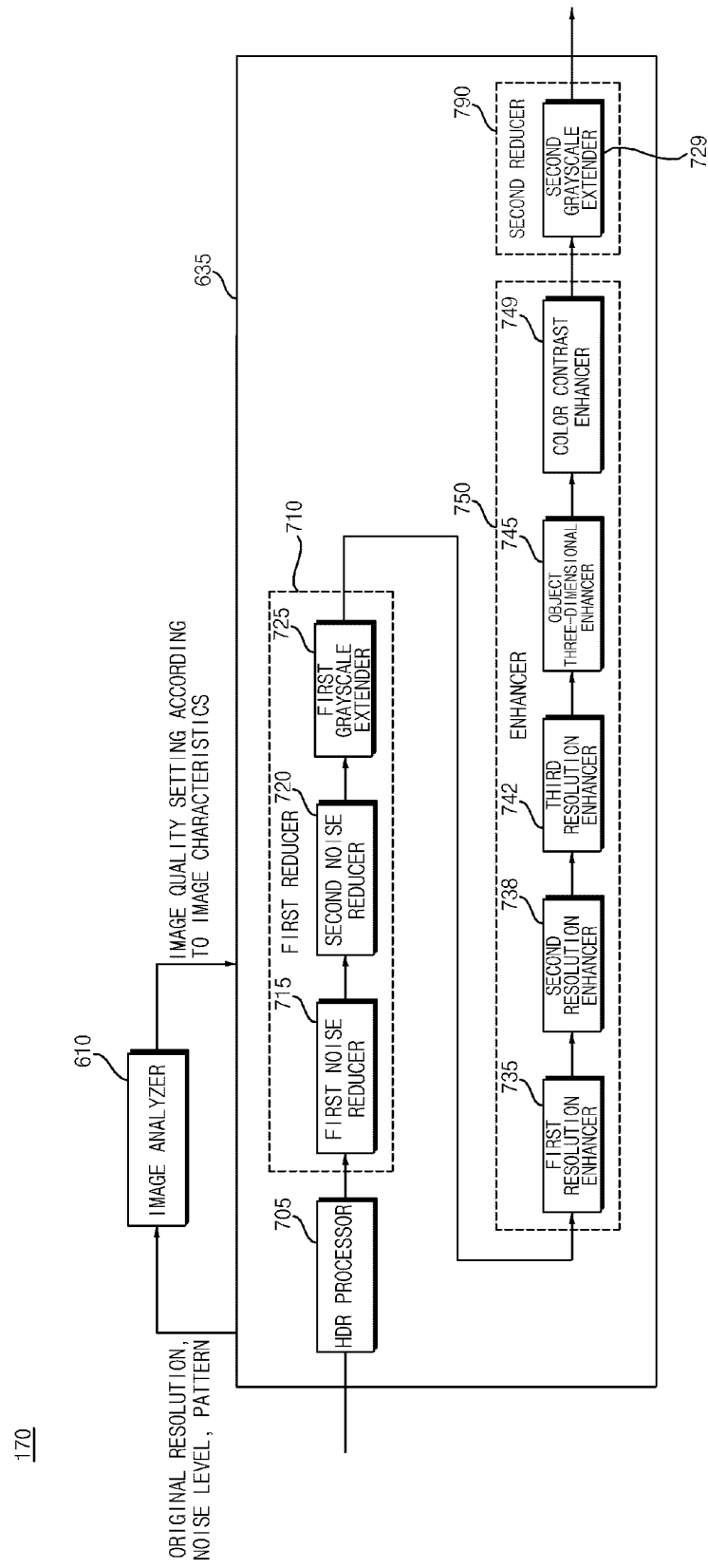
FIG. 10 is an example of an internal block diagram of the signal processing apparatus of FIG. 8 or FIG. 9.

FIG. 10 is an example of an internal block diagram of the signal processing apparatus of FIG. 8 or FIG. 9.

Referring to the drawing, the signal processor 170 according to an embodiment of the present disclosure may comprise an image analyzer 610 and an image quality processor 635.

The image analyzer 610 may comprise the quality calculator 632 or the quality calculating and trainer 632b, and the image quality setter 634 of FIG. 8 or FIG. 9.

The image analyzer 610 may analyze an input image signal, and output information related to the analyzed input image signal.

Meanwhile, the image analyzer 610 may differentiate an object region and a background region of a first input image signal. Alternatively, the image analyzer 610 may calculate a probability or percentage of the object region and the background region of the first input image signal.

The input image signal may be an input image signal from an image receiver 105 or an image decoded by the image decoder 320 in FIG. 4.

In particular, the image analyzer 610 may analyze an input image signal using artificial intelligence (AI), and output information on the analyzed input image signal.

Specifically, the image analyzer 610 may output a resolution, grayscale, a noise level, and a pattern of an input image signal, and output information on the analyzed input image signal, especially image setting information, to the image quality processor 635.

The image quality processor 635 may comprise an HDR processor 705, a first reducer 710, an enhancer 750, and a second reducer 790.

The HDR processor 705 may receive an image signal and perform high dynamic range (HDR) processing on the input image signal.

For example, the HDR processor 705 may convert a standard dynamic range (SDR) image signal into an HDR image signal.

For another example, the HDR processor 705 may receive an image signal, and perform grayscale processing on the input image signal for an HDR.

Meanwhile, if an input image signal is an SDR image signal, the HDR processor 705 may bypass grayscale conversion, and, if an input image signal is an HDR image signal, the HDR processor 705 perform grayscale conversion. Accordingly, it is possible to improve high grayscale expression for an input image.

Meanwhile, the HDR processor 705 may perform grayscale conversion processing based on a first grayscale conversion mode, in which low grayscale is highlighted compared to high grayscale and the high grayscale is saturated, and a second grayscale conversion mode in which the low grayscale and the high grayscale are converted somewhat uniformly.

Specifically, when the first grayscale conversion mode is performed, the HDR processor 705 may perform grayscale conversion processing based on data corresponding to the first grayscale conversion mode in a lookup table.

More specifically, when the first grayscale conversion mode is performed, the HDR processor 705 may perform grayscale conversion processing based on an arithmetic expression for input data and the first grayscale conversion mode in a lookup table determined by the arithmetic expression. Here, the input data may comprise video data and metadata.

Meanwhile, when the second grayscale conversion mode is performed, the HDR processor 705 may perform grayscale conversion processing based on data corresponding to the second grayscale conversion mode in a lookup table.

More specifically, when the second grayscale conversion mode is performed, the HDR processor 705 may perform grayscale conversion processing based on an arithmetic expression for input data and data corresponding to the second grayscale conversion mode in a lookup table determined by the arithmetic expression. Here, the input data may comprise video data and metadata.

Meanwhile, the HDR processor 705 may select the first grayscale conversion mode or the second grayscale conversion mode according to a third grayscale conversion mode or a fourth grayscale conversion mode in a high grayscale amplifier 851 in the second reducer 790.

For example, when the third grayscale conversion mode is performed, the high grayscale amplifier 851 in the second reducer 790 may perform grayscale conversion processing based on data corresponding to the third grayscale conversion mode in a lookup table.

Specifically, when the third grayscale conversion mode is performed, the high grayscale amplifier 851 in the second reducer 790 may perform grayscale conversion processing based on an arithmetic expression for input data and data corresponding to the third grayscale conversion mode in a lookup table determined by the arithmetic expression. Here, the input data may comprise video data and metadata.

Meanwhile, when the fourth type grayscale conversion is performed, the high grayscale amplifier 851 in the second reducer 790 may perform grayscale conversion processing based on data corresponding to the fourth grayscale conversion mode in a lookup table.

Specifically, when the fourth grayscale conversion mode is performed, the high grayscale amplifier 851 in the second reducer 790 may perform grayscale conversion processing based on an arithmetic expression for input data and data corresponding to the fourth grayscale conversion mode in a lookup table determined by the arithmetic expression. Here, the input data may comprise video data and metadata.

For example, when the fourth grayscale conversion mode is performed in the high grayscale amplifier 851 in the second reducer 790, the HDR processor 705 may implement the second grayscale conversion mode.

For another example, when the third grayscale conversion mode is performed in the high grayscale amplifier 851 in the second reducer 790, the HDR processor 705 may implement the first grayscale conversion mode.

Alternatively, the high grayscale amplifier 851 in the second reducer 790 may change a grayscale conversion mode according to a grayscale conversion mode in the HDR processor 705.

For example, when the second grayscale conversion mode is performed in the HDR processor 705, the high grayscale amplifier 851 in the second reducer 790 may perform the fourth grayscale conversion mode.

For another example, when the first grayscale conversion mode is performed in the HDR processor 705, the high grayscale amplifier 851 in the second reducer 790 may implement the third grayscale conversion mode.

Meanwhile, the HDR processor 705 according to an embodiment of the present invention may implement a grayscale conversion mode so that low grayscale and high grayscale are converted uniformly.

Meanwhile, according to the second grayscale conversion mode in the HDR processor 705, the second reducer 790 may implement the fourth grayscale conversion mode and thereby amplify an upper limit on grayscale of a received input signal. Accordingly, it is possible to improve high grayscale expression for the input image.

Next, the first reducer 710 may perform noise reduction on an input image signal or an image signal processed by the HDR processor 705.

Specifically, the first reducer 710 may perform a plurality of stages of noise reduction processing and a first stage of grayscale extension processing on an input image signal or an HDR image from the HDR processor 705.

To this end, the first reducer 710 may comprise a plurality of noise reducers 715 and 720 for multi-stage noise reduction, and a grayscale extender 725 for grayscale extension.

Next, the enhancer 750 may perform a plurality of stages of image resolution enhancement processing on an image from the first reducer 710.

In addition, the enhancer 750 may perform object three-dimensional effect enhancement processing. In addition, the enhancer 750 may perform color or contrast enhancement processing.

To this end, the enhancer 750 may comprise a plurality of resolution enhancers 735, 738, 742 for enhancing a resolution of an image in a plurality of stages, an object three-dimensional effect enhancer 745 for enhancing a three-dimensional effect of an object, and a color contrast enhancer 749 for enhancing color or contrast.

Next, the second reducer 790 may perform a second stage of grayscale extension processing based on a noise-reduced image signal received from the first reducer 710.

Meanwhile, the second reducer 790 may amplify an upper limit on grayscale of an input signal, and extend a resolution of high grayscale of the input signal. Accordingly, it is possible to improve high grayscale expression for an input image.

For example, grayscale extension may be performed uniformly on the entire grayscale range of a input signal. Accordingly, grayscale extension is performed uniformly on the entire area of an input image, thereby improving high grayscale expression.

Meanwhile, the second reducer 790 may perform grayscale amplification and extension based on a signal received from the first grayscale extender 725. Accordingly, it is possible to improve high grayscale expression for an input image.

Meanwhile, if an input image signal input is an SDR image signal, the second reducer 790 may vary the degree of amplification based on a user input signal. Accordingly, it is possible to improve high grayscale expression in response to a user setting.

Meanwhile, if an input image signal is an HDR image signal, the second reducer 790 may perform amplification according to a set value. Accordingly, it is possible to improve high grayscale expression for an input image.

Meanwhile, if an input image signal is an HDR image signal, the second reducer 790 may vary the degree of amplification based on a user input signal. Accordingly, it is possible to improve high grayscale expression according to a user setting.

Meanwhile, in the case of extending grayscale based on a user input signal, the second reducer 790 may vary the degree of extension of grayscale. Accordingly, it is possible to improve high grayscale expression according to a user's setting.

Meanwhile, the second reducer 790 may amplify an upper limit on grayscale according to a grayscale conversion mode in the HDR processor 705. Accordingly, it is possible to improve high grayscale expression for an input image.

The signal processing apparatus 170 includes the HDR processor 705 configured to receive an image signal and adjust luminance of the input image signal, and the reducer 790 configured to amplify brightness of the image signal received from the HDR processor 705 and increase grayscale resolution of the image signal to thereby generate an enhanced image signal. The enhanced image signal provides increased luminance and increased grayscale resolution of the image signal while a high dynamic range in a displayed HDR image is maintained.

Meanwhile, the range of brightness of the image signal is adjusted by a control signal received by the signal processing apparatus 170.

Meanwhile, the signal processing apparatus 170 further comprises an image analyzer configured to determine whether an input image signal is an HDR signal or an SDR signal, and generate a control signal to be provided to the HDR processor 705. The range of brightness of an input image signal is adjusted by a control signal only when the input image signal is an HDR signal.

Meanwhile, the control signal is received from a controller of an image display apparatus, which relates to signal processing, and the control signal corresponds to a setting of the image display apparatus.

Meanwhile, a resolution of grayscale is increased based on amplification of adjusted brightness of an image signal.

Meanwhile, a resolution of grayscale is increased based on a control signal received by the signal processing apparatus 170.

Meanwhile, a control signal is received from a controller of an image display apparatus, which relates to signal processing, and the control signal corresponds to a setting of the image display apparatus.

Meanwhile, the reducer 790 may comprise the high grayscale amplifier 851 configured to amplify an upper limit on grayscale of an input signal, and a decontourer 842 and 844 configured to extend the resolution of grayscale amplified by the high grayscale amplifier 851.

The second reducer 790 may comprise a second grayscale extender 729 for a second stage of grayscale extension.

Meanwhile, the image quality processor 635 in the signal processing apparatus 170 according to the present disclosure is characterized in performing four stages of reduction processing and four stages of image enhancement processing, as shown in FIG. 8.

Here, the four stages of reduction processing may comprise two stages of noise reduction processing and two stages of grayscale extension processing.

Herein, the two stages of noise reduction processing may be performed by the first and second noise reducers 715 and 720 in the first reducer 710, and the two stages of grayscale extension processing may be performed by the first grayscale extender 725 in the first reducer 710 and the second grayscale extender 729 in the second reducer 790.

Meanwhile, the four stages of image enhancement processing may comprise three stages of image resolution enhancement (bit resolution enhancement) and object three-dimensional effect enhancement.

Here, the three stages of image enhancement processing may be performed by the first to third resolution enhancers 735, 738, and 742, and the object three-dimensional effect enhancement may be performed by the object three-dimensional enhancer 745.

Meanwhile, the signal processing apparatus 170 of the present disclosure may perform image quality processing in a plurality of stages, in which an image quality may be improved gradually by applying the same algorithm or similar algorithms a plurality of times.

To this end, the image quality processor 635 of the signal processing apparatus 170 of the present disclosure may perform image quality processing by applying the same algorithm or similar algorithms two or more times.

Meanwhile, the same algorithm or the similar algorithms implemented by the image quality processor 635 have a different purpose to achieve in each stage. In addition, since image quality processing is performed gradually in a plurality of stages, there is an advantageous effect to cause a less number of artifacts to appear in an image, resulting in a more natural and more vivid image processing result.

Meanwhile, the same algorithm or the similar algorithms are applied plurality of times alternately with a different image quality algorithm, thereby bringing an effect more than simple continuous processing.

Meanwhile, the signal processing apparatus 170 of the present disclosure may perform noise reduction processing in a plurality of stages. Each stage of the noise reduction processing may comprise temporal processing and spatial processing.

Meanwhile, in order to calculate an original quality of an image signal, the present disclosure uses the state-of-the-art technology such as artificial intelligence (AI). To this end, a Deep Neural Network (DNN) may be used.

The quality calculator 632 may calculate a resolution and a noise level of an input image signal by using a Deep Neural Network (DNN).

The quality calculator 632 or the quality calculator 670 may obtain an original resolution and a training image for each compression rate, and train the network so as to increase accuracy of the calculation.

A variety of images which can be commonly seen in ordinary broadcasting programs are provided as images used for the training, and thus, it is possible to cover any input environment.

Meanwhile, in order to reduce detection time or cost, the quality calculator 632 may perform training using Convolutional Neural Network, Mobile-Net, and the like which has a small number of layers.

For example, the quality calculator 632 may analyze only some regions (e.g., 224×224, 128×128, 64×64, etc.) in an entire image.

Meanwhile, the quality calculator 632 may select a detection region appropriate for a purpose of detection.

For example, the quality calculator 632 may select a first region having the greatest number of edge components when detecting an original resolution, and select a second region having the least number of edge components when detecting noise.

In particular, the quality calculator 632 may apply an algorithm that selects a detection region in a short time in order to increase a processing speed.

For example, the quality calculator 632 may perform pre-processing, such as Fast Fourier Transform (FFT), on a detection region.

Figure 11A:
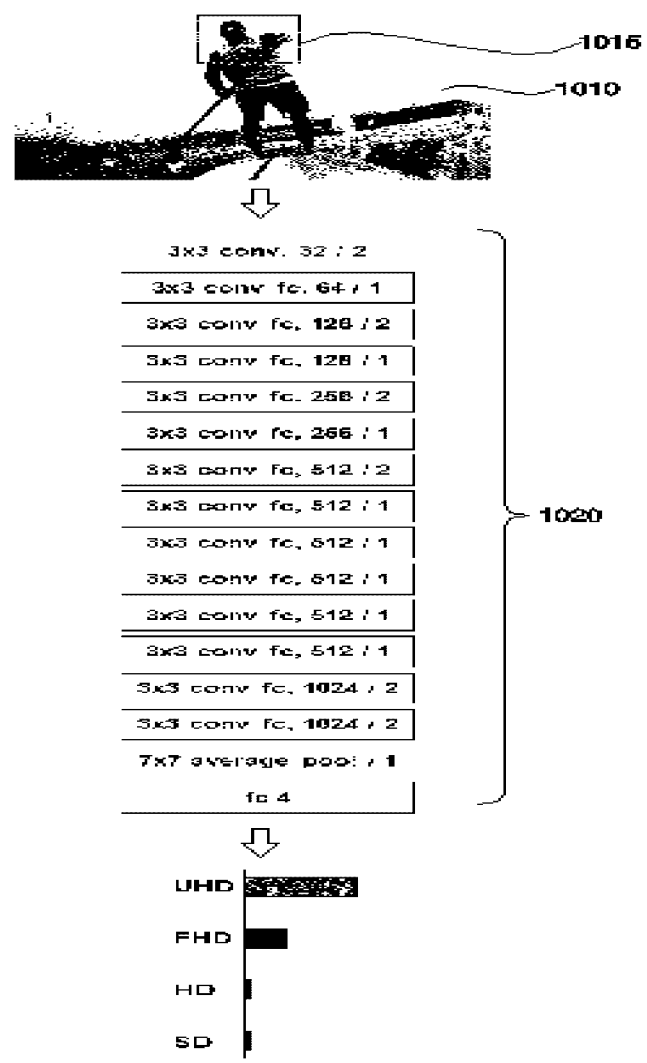

FIGS. 11A and 11B are diagrams referred to in the description of operation of the signal processing apparatus of FIG. 8 or FIG. 9.

First, FIG. 11A is a diagram illustrating calculation based on a Convolutional Neural Network.

Referring to the drawing, the Convolutional Neural Network is used for a particular region 1015 in an acquired image 1010.

As the Convolution Neural Network, a Convolution network and a Deconvolution network may be implemented.

According to the Convolution Neural Network, convolution and pooling are performed repeatedly.

Meanwhile, according to the CNN scheme shown in FIG. 11A, information on a region 1015 may be used to determine types of pixels in the region 1015.

Next, FIG. 11B is a diagram illustrating calculation based on Mobile-Net.

According to the scheme shown in the drawing, quality calculation is performed.

Meanwhile, the controller 170 of the present disclosure may apply, as original quality changes, an image quality setting corresponding to the changed quality in real time.

In particular, in the case of changing an image quality setting, the signal processing apparatus 170 may apply the change of the image quality setting without any condition such as a channel change or an input change while an image is reproduced.

In this case, "real time" refers to use of a temporal processing technique including imaging infrared (IIR) and step movement.

Meanwhile, according to a user UX scenario, the image display apparatus 100 may display one or more images and sounds among various contents.

Meanwhile, with the development of displays, the image display apparatus 100 has been improved to provide better image quality for consumers.

Meanwhile, as the AI technology has been developed recently, many research results have been published in the fields of computer vision, image processing, natural language processing, etc., which transcend the existing techniques.

As in the other devices, the image display apparatus 100 has an artificial intelligence (AI) UI based on speech recognition technology, and research is underway to apply the AI technology to image quality processing. However, an integrated framework for the AI image display apparatus 100 has not yet been proposed.

Accordingly, the present disclosure provides technology for adjusting outputs to provide an optimal viewing environment for viewers of the image display apparatus 100, by collecting information on viewers and viewing environments from sensor inputs of the image display apparatus 100.

For example, a sensor device of the image display apparatus 100 may comprise a remote controller 200, a microphone, an illumination sensor, a motion sensor, a position sensor, a camera, and the like.

The AI based image display apparatus 100 according to an embodiment of the present disclosure may extract information from the inputs sensed by the sensor device and the like, and may adjust outputs, such as image or audio outputs, in an artificial intelligence manner.

To this end, the AI-based image display apparatus 100 may receive images from an external source, and may receive a variety of sensing information from the sensor device and the like to exchange data with an external server 600.

Meanwhile, the AI-based image display apparatus 100 according to an embodiment of the present disclosure may collect image and audio information by using a virtual sensor device and an actual sensor device, and by considering actual viewing environments of viewers, the AI-based image display apparatus 100 may provide image quality processing, audio processing, content recommendation, etc., which are suitable for viewers or content. A description thereof will be made below with reference to FIG. 12 and the following figures.

FIG. 12 is an example of an internal block diagram of an image display apparatus according to an embodiment of the present disclosure, and FIGS. 13 to 15C are diagrams referred to in the description of operation of FIG. 12.

First, referring to FIG. 12, the image display apparatus 100 according to an embodiment of the present disclosure may comprise a signal processing apparatus 170 configured to perform image processing of the input image and audio processing of audio data corresponding to the input image, a virtual AI processor 160, a memory 140, a network interface 135, and a user input interface 150.

Figure 13:
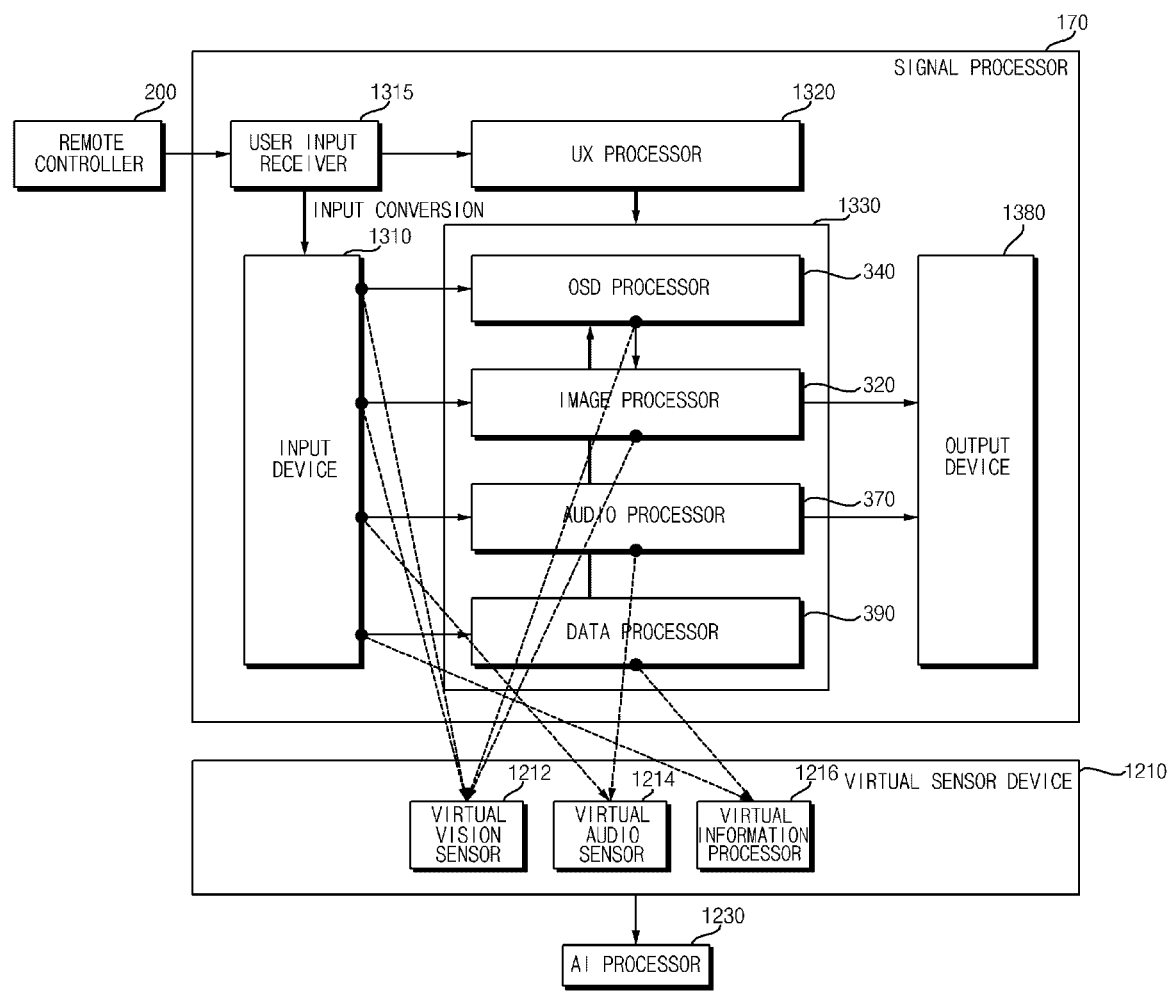

As illustrated in FIG. 13 and the like, the signal processing apparatus 170 may comprise a user input receiver 1315 configured to receive a user input from the remote controller 200, an input device 1310 configured to receive image and audio data, a UX processor 1320 configured to perform UX processing, an OSD processor 340 configured to perform OSD processing, an image processor 320 configured to perform image processing, an audio processor 370 configured to perform audio processing, a data processor 390 configured to perform data processing, and an output device 1380 configured to output the processed image and audio data.

Meanwhile, the image processor 320 may comprise the image quality processor 635 of FIGS. 7 to 10 and the like.

Meanwhile, the virtual AI processor 160 may calculate user information or viewing environment information of the image display apparatus 100 based on the input signal sensed by the sensor device 1220 and the like, and may provide optimal video viewing and audio outputs based on the user information, viewing environment information, and the like.

Meanwhile, the virtual AI processor 160 may perform image quality processing suitable for resolution and noise levels of the received image signal.

For example, even when the resolution of the input image is changed, the virtual AI processor 160 may accurately calculate the original quality of the received image signal by learning using a Deep Neural Network (DNN).

In another example, by updating a parameter for the DNN, the virtual AI processor 160 may accurately calculate the original quality of the image signal based on learning.

In yet another example, the virtual AI processor 160 may improve the accuracy in calculating image type information, and may perform image processing corresponding thereto.

Meanwhile, as illustrated in FIG. 12, the virtual AI processor 160 may comprise a virtual sensor device 1210 configured to receive image information processed by the signal processing apparatus 170, and audio information processed by the signal processing apparatus 170, a sensor device 1220 configured to collect externally captured image information or sound information, and an AI processor 1230 configured to perform image processing of the input image or audio processing based on AI using the image and audio information from the virtual sensor device 1210 and the image information or sound information from the sensor device 1220. Accordingly, it is possible to operate based on AI. Particularly, it is possible to perform image quality processing based on AI.

Meanwhile, as illustrated in FIG. 13, the virtual sensor device 1210 may comprise a virtual vision sensor 1212 configured to collect image information processed by the image processor 320 of the signal processing apparatus 170, a virtual audio sensor 1214 configured to collect audio information processed by the audio processor 370 of the signal processing apparatus 170, and a virtual information processor 1216 configured to collect data information processed by the data processor 390 of the signal processing apparatus 170.

Meanwhile, the virtual vision sensor 1212 may collect input images and intermediate processed images of the image display apparatus 100.

The virtual audio sensor 1214 may collect input audio and intermediate processed audio of the image display apparatus 100.

The virtual information processor 1216 may collect data expressed in text form. A virtual tactile sensor (not shown) may exchange information through a network.

Meanwhile, as illustrated in FIG. 14, the actual sensor device 1220 may comprise a viewing environment collector 1222 configured to receive information of the illumination sensor, the motion sensor, and the like through the interface 130, and to collect viewing environment information based on the received information, an information receiver 1223 configured to collect a user input signal from the user input receiver 1315 in the signal processing apparatus 170, a vision sensor 1224 configured to collect visual information based on the image captured by a camera and the like, and an audio sensor 1226 configured to collect audio information through a microphone and the like.

Meanwhile, the signal processing apparatus 170 may process data associated with the input image, the virtual sensor device 1210 may receive the data information processed by the signal processing apparatus 170, and the AI processor 1230 may perform image processing of the input image or audio processing based on AI using the data information, the image and audio information from the virtual sensor device 1210, and the image or sound information from the sensor device 1220. Accordingly, image processing or audio processing may be performed based on AI.

Meanwhile, the signal processing apparatus 170 may receive a user input signal from the remote controller 200, the sensor device 1220 may collect information on the user input signal, the AI processor 1230 may perform image processing of the input image or audio processing based on AI using the information on the user input signal, the image and audio information from the virtual sensor device 1210, and the image or sound information from the sensor device 1220. Accordingly, image processing or audio processing may be performed based on AI.

Meanwhile, the sensor device 1220 may collect viewing environment information based on illumination information from the illumination sensor and motion information from the motion sensor, and the AI processor 1230 may perform image processing of the input image or audio processing based on AI using the viewing environment information, the image and audio information from the virtual sensor device 1210, and the image or sound information from the sensor device 1220. Accordingly, image processing or audio processing may be performed based on AI.

Meanwhile, the sensor device 1220 may collect externally captured image information from a camera, and may collect external sound information from a microphone. Accordingly, audio processing may be performed based on AI.

Meanwhile, the viewing environment information may comprise at least one of screen brightness information and viewing concentration information. Accordingly, image processing may be performed based on AI.

Meanwhile, the signal processing apparatus 170 may comprise an image quality processor 635 configured to perform image quality processing. The image quality processor 635 may perform image quality processing based on the image information from the virtual sensor device 1210 and the image information from the sensor device 1220, according to an image quality set by the AI processor 1230. Accordingly, image quality processing may be performed based on AI.

Meanwhile, the AI processor 1230 may comprise an information extractor (not shown), a context extractor (not shown), an information analyzer (not shown), a viewer response processor (not shown), and a learning processor (not shown).

The information extractor (not shown) may comprise a virtual information extractor (not shown) and an actual information extractor (not shown). The virtual information extractor (not shown) may analyze data collected by the virtual sensor device 1210 and may convert the data into content information. The actual information extractor (not shown) may analyze data collected by the sensor device 1220 and may convert the data into viewing information (viewer/viewing environment).

The context extractor (not shown) may comprise a virtual context extractor (not shown) and a viewing context extractor (not shown). The virtual context extractor (not shown) may extract contexts from content information items. The viewing context extractor (not shown) may extract user response contexts.

The information analyzer (not shown) may combine and analyze information between the virtual and actual information extractors and the virtual and actual context extractors.

The viewer response processor (not shown) may output responses according to a viewer's response context from the information analyzer (not shown).

The learning processor (not shown) learns by itself a relationship between content and viewing information based on operation information of the information extractor (not shown), the context extractor (not shown), the information analyzer (not shown), and the viewer response processor (not shown).

Meanwhile, the virtual vision sensor 1212 and the virtual audio sensor 1214 in the virtual sensor device 1210 may also collect information from the actual camera and microphone.

Meanwhile, the AI processor 1230 in the image display apparatus 100 may obtain statistics about the time when a user turns on the image display apparatus 100 for each day of the week, and may separately add a frequently occurring time to a list.

Meanwhile, the AI processor 120 in the image display apparatus 100 may perform an operation to automatically turn on the image display apparatus 100 at a corresponding time even when the image display apparatus 100 is turned off, or an operation to ask a user whether to turn on the image display apparatus 100.

Meanwhile, when the image display apparatus 100 includes a motion sensor for sensing the presence of an individual near the image display apparatus 100, or a corresponding device, and recognizes that no user is present, the AI processor 1230 in the image display apparatus 100 may not turn on the image display apparatus 100. By contrast, upon recognizing that a user is present, the AI processor 1230 in the image display apparatus 100 may turn on the image display apparatus 100 in various manners.

Meanwhile, if the function is enabled through a user interface UI, the AI processor 1230 in the image display apparatus 100 may turn on the image display apparatus 100 at a corresponding time.

Meanwhile, if sound to turn on the image display apparatus 100 is input while the display 180 is not turned on, the AI processor 1230 in the image display apparatus 100 may turn on the image display apparatus 100 based on the sound.

Meanwhile, the AI processor 1230 in the image display apparatus 100 may turn on an application or the image display apparatus 100.

Meanwhile, when the image display apparatus 100 turns on, the AI processor 1230 in the image display apparatus 100 may automatically reflect a user's preferred channel at the corresponding time and preferred image quality setting according to a genre of a video of the channel.

Meanwhile, immediately after the image display apparatus 100 is turned on, once an illumination sensor and a microphone are activated and recognize an ambient illumination value, ambient noise, and voice, the AI processor 1230 in the image display apparatus 100 may reflect the preferred image quality and volume setting.

Meanwhile, upon sensing the illumination sensor and the microphone before the image display apparatus 100 is turned on, the AI processor 1230 in the image display apparatus 100 may be activated together with the image display apparatus 100 when the image display apparatus 100 is turned on.

Meanwhile, the AI processor 1230 in the image display apparatus 100 may analyze various statistics.

Meanwhile, once a number of data corresponding to a predetermined number are obtained for analysis of various statistics, such that the number is determined as a preferred value, the AI processor 1230 in the image display apparatus 100 may select various data and may determine a setting.

Meanwhile, once speech recognition is performed, the AI processor 1230 in the image display apparatus 100 may perform analysis of the respective statistics separately for each voice ID.

When the image display apparatus 100 is turned on, the AI processor 1230 in the image display apparatus 100 may control predetermined database information to be set according to sensing result values from the illumination sensor, microphone, and the like of the remote controller 200.

Meanwhile, once speech recognition is performed in response to a viewer's speech after the image display apparatus 100 is turned on, the AI processor 1230 in the image display apparatus 100 may adjust a preferred value of the viewer.

Meanwhile, when recognition of the viewer's speech is performed before the image display apparatus 100 is turned on, the AI processor 1230 in the image display apparatus 100 may set a viewer's preferred value immediately when the image display apparatus 100 is turned on.

Meanwhile, when a motion sensor senses that a viewer is not located within an effective range while the image display apparatus 100 is turned on, the AI processor 1230 in the image display apparatus 100 may change an operation mode of the image display apparatus 100.

For example, the AI processor 1230 in the image display apparatus 100 may change the operation mode of the image display apparatus 100 to any one of the following: a mode for turning off the entire image display apparatus 100, a mode for turning off the display of the image display apparatus 100, a minimum operation mode, a mode for reducing brightness, a mode for minimizing image quality processing, and a mode for performing basic functions.

Meanwhile, referring to FIG. 15A, based on information sensed by the actual vision sensor 1225, the AI processor 1230 in the image display apparatus 100 may extract a viewer's facial expression and gesture, a recognized viewer, and the like, and may extract contexts, such as a current response, a response change, and the like.

Meanwhile, based on information sensed by the actual audio sensor 1226, the AI processor 1230 in the image display apparatus 100 may extract search information, taste, preference, viewer response expressions, and the like, and may extract contexts, such as search, taste, frequency of preferred selection, current emotion, and the like.

Meanwhile, the AI processor 1230 in the image display apparatus 100 may extract an input selection, setting information, and the like through the information receiver 1223, and may extract contexts such as preferred input, channel, preferred setting, and the like.

Meanwhile, the AI processor 1230 in the image display apparatus 100 may extract input selection, ambient brightness, and the like through an illumination sensor and the like, and may extract contexts such as taste in environment, screen brightness, and the like.

Meanwhile, the AI processor 1230 in the image display apparatus 100 may extract information on whether a user views a video and the like through a motion sensor and the like, and may extract contexts such as viewing concentration and the like.

Referring to FIG. 15B, the AI processor 1230 in the image display apparatus 100 may operate a power on key of the remote controller 200, so as to perform information processing such as statistics about the power on time for each day of the week, and may control wake-on, guidance, or the like to be performed at a corresponding time.

Meanwhile, the AI processor 1230 in the image display apparatus 100 may perform information may operate a channel control key KBc of the remote controller 200, so as to perform information processing such as statistics about viewed channels for each day and time and the like, and when powered on, the AI processor 1230 in the image display apparatus 100 may perform automatic channel setting and the like.

Meanwhile, the AI processor 1230 in the image display apparatus 100 may operate a volume control key KBa of the remote controller 200, so as to perform processing such as analysis of a viewer's volume control action in response to ambient noise, and may perform automatic volume control and the like.

Meanwhile, the AI processor 1230 in the image display apparatus 100 may operate an image quality control key KBb of the remote controller 200, so as to perform processing such as analysis of a viewer's image quality control action in response to ambient noise, and may perform automatic image quality control and the like.

Meanwhile, the AI processor 1230 in the image display apparatus 100 may perform processing, such as ambient noise, utterance made by a viewer, recognition of a wake up word and voiceprint, and the like, in response to input of ambient noise, wake up word, voiceprint, and the like through a microphone, and may adaptively adjust a sound volume in response to the ambient noise and utterance made by the viewer, may process the wake-up word and a follow-up input, voiceprint recognition, and the like.

Meanwhile, the AI processor 1230 in the image display apparatus 100 may perform processing, such as converting brightness magnitude into numerical values based on ambient brightness information from an illumination sensor, and may adaptively adjust brightness, contrast, and the like.

Meanwhile, the AI processor 1230 in the image display apparatus 100 may analyze the presence of a viewer using a position sensor and a motion sensor, the presence of a viewer near the image display apparatus 100 based on viewer position information, and an angle formed between a viewer and the image display apparatus 100, and if no viewer is present, the AI processor 1230 may change a mode to an off mode or a minimum operation mode, or may adjust an optimal image quality or sound for a viewing angle, and the like.

Meanwhile, the signal processing apparatus 170 may process data related to the input image, the virtual sensor device 1210 may receive data information processed by the signal processing apparatus 170, and the AI processor 1230 may perform image processing of the input image or audio processing based on AI using the data information, the image and audio information from the virtual sensor device 1210, and the image or sound information from the sensor device 1220. Accordingly, image processing or audio processing may be performed based on AI.

Meanwhile, the signal processing apparatus 170 may receive a user input signal from the remote controller 200, the sensor device 1220 may collect information on the user input signal, and the AI processor 1230 may perform image processing of the input image or audio processing based on AI using the information on the user input signal, the image and audio information from the virtual sensor device 1210, and the image or sound information from the sensor device 1220. Accordingly, image processing or audio processing may be performed based on AI.

Meanwhile, the sensor device 1220 collects viewing environment information based on the illumination information from the illumination sensor and the motion information from the motion sensor, and the AI processor 1230 may perform image processing of the input image or audio processing based on AI using the viewing environment information, the image and audio information from the virtual sensor device 1210, and the image or sound information from the sensor device 1220. Accordingly, image processing or audio processing may be performed based on AI.

Meanwhile, the sensor device 1220 may collect externally captured image information from a camera, and may collect external sound information from a microphone. Accordingly, audio processing may be performed based on AI.

Meanwhile, the viewing environment information may comprise at least one of screen brightness information and viewing concentration information. Accordingly, image processing may be performed based on AI.

Meanwhile, the signal processing apparatus 170 may comprise an image quality processor 635 configured to perform image quality processing. The image quality processor 635 may perform image quality processing according to an image quality set by the AI processor 1230 based on the image information from the virtual sensor device 1210 and the image information from the sensor device 1220. Accordingly, image quality processing may be performed based on AI.

Meanwhile, the signal processing apparatus 170 may perform image quality processing according to the image quality set by the AI processor 1230 based on an image type of the input image and the viewing environment information related to a viewer. Accordingly, image quality processing may be performed based on AI.

Meanwhile, the signal processing apparatus 170 may perform image quality processing according to the image quality set by the AI processor 1230 based on the on-time information of the image display apparatus, channel information, video genre information, and image quality setting information according to illumination. Accordingly, image quality processing may be performed based on AI.

Meanwhile, the signal processing apparatus 170 may comprise an audio processor 370 configured to perform audio processing. The audio processor 370 may perform audio processing based on audio information from the virtual sensor device 1210 and the sound information from the sensor device 1220 according to a sound quality set by the AI processor 1230. Accordingly, audio processing may be performed based on AI.

Meanwhile, the signal processing apparatus 170 may perform audio processing according to the sound quality set by the AI processor 1230 based on an audio type of the audio corresponding to the input image, and the viewing environment information related to a viewer. Accordingly, audio processing may be performed based on AI.

Meanwhile, the signal processing apparatus 170 may perform audio processing according to the sound quality set by the AI processor 1230 based on the on-time information of the image display apparatus, channel information, and video genre information, sound volume setting information in response to ambient noise. Accordingly, audio processing may be performed based on AI.

Figure 15C:
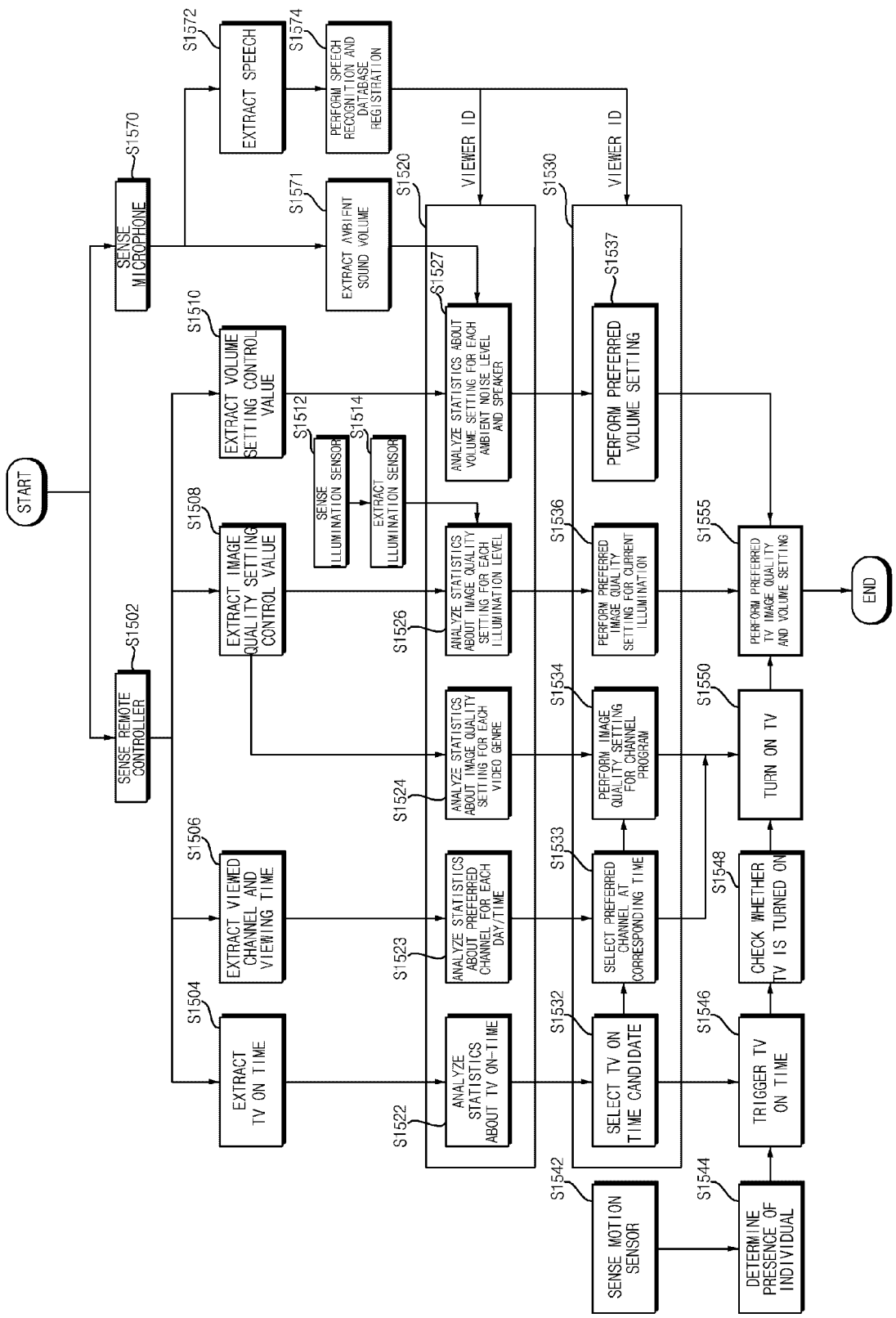

FIG. 15C illustrates an operation flowchart when a remote controller and a microphone are sensed.

First, when the remote controller 200 is sensed (S1502), the AI processor 1230 extracts TV on time (S1504), extracts a viewed channel and a viewing time (S1506), extracts an image quality setting control value (S1508), and extracts a volume setting control value (S1510).

Meanwhile, in response to the respective extractions in operations 1504 to 1510, the AI processor 1230 analyzes statistics about the TV on time (S1522), analyzes statistics about the preferred channels for each day/time (S1523), analyzes statistics about the image quality setting for each video genre (S1524), analyzes statistics about image quality setting for each illumination level (S1526), and analyzes statistics about volume setting for each ambient noise level and speaker (S1527).

Further, in response to the respective operations 1522 to 1527, the AI processor 1230 selects a TV on time candidate (S1532), selects a preferred channel at a corresponding time (S1533), performs image quality setting for a channel program (S1534), performs preferred image quality setting for a current illumination level (S1536), and performs preferred volume setting (S1537).

Meanwhile, upon sensing the motion sensor (S1542), the AI processor 1230 determines the presence of an individual (S1544), triggers the TV on time (S1546), checks whether the TV is turned on (S1548), turns on the TV (S1550), and performs preferred TV image quality and volume setting (S1555).

Meanwhile, upon sensing the microphone (S1570), the AI processor 1230 extracts an ambient sound volume (S1571), extracts speech (S1572), and performs speech recognition and database registration (S1555).

Meanwhile, the AI processor 1230 classifies viewer IDs based on the sound extraction (S1572) and performs the speech recognition and database registration (S1574), and based on the classified viewer IDs, the AI processor 1230 may analyze statistics about the sound volume setting in operation 1527 or may perform the preferred sound volume setting in operation 1537.

Figure 16:
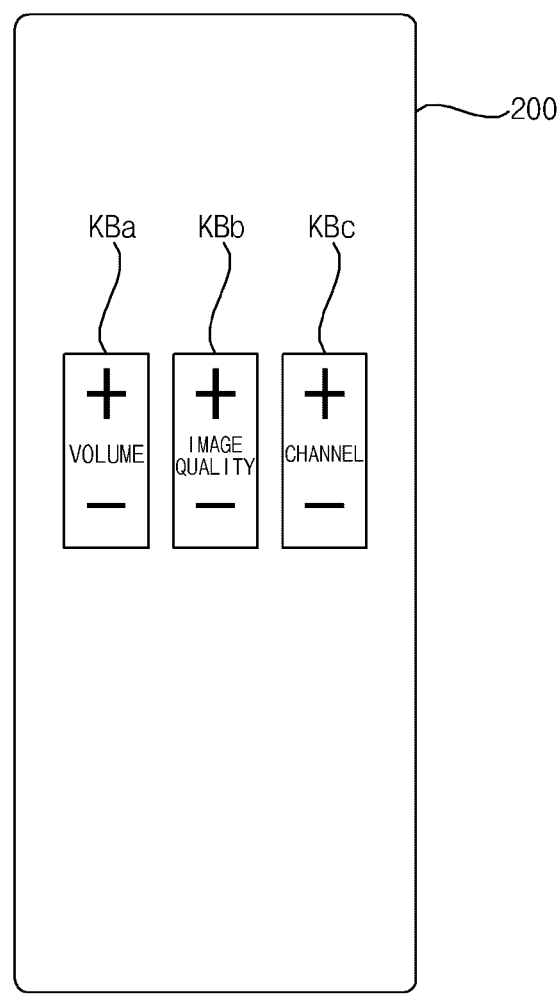
FIG. 16 is a diagram illustrating an example of a remote controller according to an embodiment of the present disclosure.

FIG. 16 illustrates an example of a remote controller 200 including the volume control key KBa, the image quality control key KBb, and the channel control key KBc.

The volume control, the image quality control, the channel control, and the like may be performed by the volume control key KBa, the image quality control key KBb, and the channel control key KBc, respectively.

Meanwhile, based on at least one of brightness, contrast, sharpness, and chroma which are set by the image quality control key KBb, the signal processing apparatus 170 may perform image quality processing according to the image quality set by the AI processor 1230.

Figure 17:
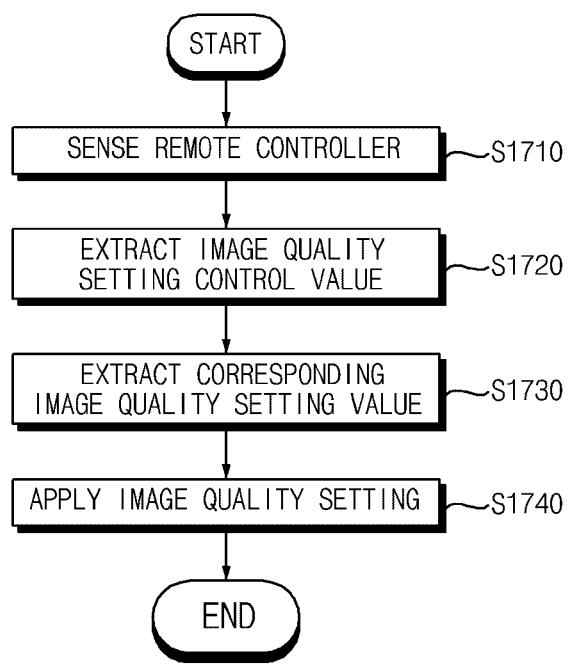
FIG. 17 is a flowchart illustrating an operating method of an image display apparatus according to an embodiment of the present disclosure.

FIG. 17 is a flowchart illustrating an operating method of an image display apparatus according to an embodiment of the present disclosure, and FIGS. 18 to 20B are diagrams referred to in the description of the operating method of FIG. 17.

Referring to the drawings, the AI processor 1230 of the image display apparatus 100 senses a remote controller (S1710), extracts an image quality setting control value based on the operation of the sensed remoted controller (S1720), extracts a corresponding image quality setting value (S1730), and applies image quality setting based on the extracted image quality setting value (S1740).

For example, according to the set image quality, the AI processor 1230 of the image display apparatus 100 may perform image quality processing corresponding to a noise reduction setting value and a sharpness setting value.

In another example, based on resolution information, encoding information, and the like of the input image, the AI processor 1230 of the image display apparatus 100 may perform image quality processing corresponding to a noise reduction setting value and a sharpness setting value according to the set image quality.

Meanwhile, the image quality control key KBb of FIG. 16 may operate for various image quality settings as illustrated in FIG. 18.

For example, the AI processor 1230 of the image display apparatus 100 may set brightness information, contrast information, sharpness information, chroma information, and the like by operating the image quality control key KBb, and may set the brightness, contrast, sharpness, chroma, and the like of the image according to the corresponding setting.

In FIG. 16, the brightness information, contrast information, sharpness information, and chroma information are classified into K stages from 0 to K−1, and unlike the drawing, various modifications may be made.

Meanwhile, the AI processor 1230 of the image display apparatus 100 may calculate setting values of each stage based on ambient illumination values.

As levels of preferred setting values may vary depending on illustration of each actual user, the AI processor 1230 of the image display apparatus 100 may learn a step of readjusting by a user according to illumination values of a user environment, so as to perform remapping of the illumination values to each stage.

Meanwhile, based on viewer position information calculated using the image information captured by the sensor device 1220, the signal processing apparatus 170 may perform image quality processing according to the image quality set by the AI processor 1230. Accordingly, image quality processing may be performed based on AI.

Based on the viewer position information calculated using the image information captured by the sensor device 1220, the signal processing apparatus 170 may perform audio processing according to the sound quality set by the AI processor 1230. Accordingly, audio processing may be performed based on AI.

Figure 19:
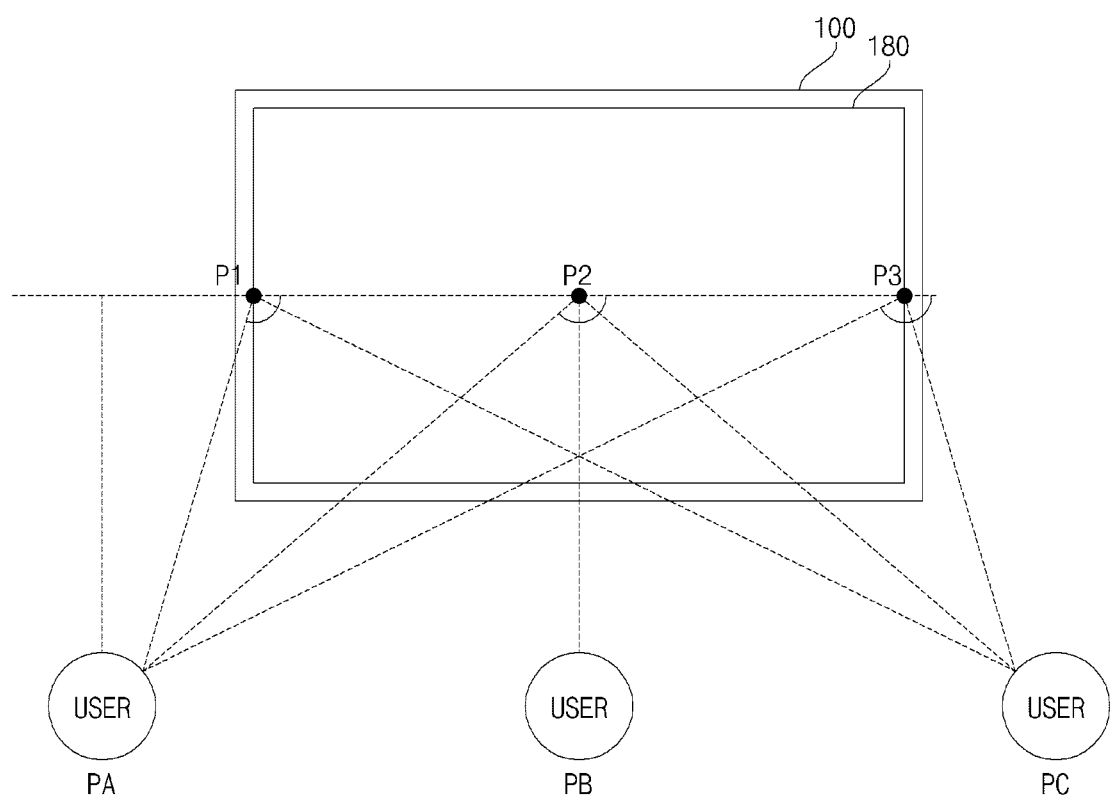

FIG. 19 is a diagram referred to for sensing the position or presence of a viewer.

Referring to the drawing, in the case where the image display apparatus 100 includes the position sensor or the motion sensor or the remote controller 200, the AI processor 1230 may calculate the position, angle, distance, and the like of a viewer based on the sensing information from each sensor.

Particularly, as illustrated in the drawing, the AI processor 1230 may calculate a viewer's position, angle, and the like between the image display apparatus 100 and a viewer.

In the drawing, an angle and the like are illustrated when a viewer is located at positions PA, PB, and PC.

Meanwhile, in the case where the viewer is located at PA or PC, instead of PB, image or audio distortion may occur, such that in order to prevent this occurrence, the AI processor 1230 may perform image processing, image quality processing, audio processing, and the like by considering the viewer's position, angle, distance, and the like. Accordingly, it is possible to provide a viewer with images or sounds suitable for the viewer's position.

FIG. 20 is a diagram referred to in the description of operation of AI processor 1230 with respect to audio and metadata in a virtual sensor.

Referring to the drawing, as for the audio in the virtual sensor, sound quality and genre of content, object sound, speech, and the like may be input, and in response to the respective inputs, the AI processor 1230 may perform processing such as sound quality classification, use of specific audio information, sound type classification, sound-to-text conversion, and the like, and may perform optimal tuning of each sound quality element, automatic sound mode setting for each genre, sound quality tuning for each sound type, object recognition, conversion with a viewer, identifying the details of text-based content, and the like.

Meanwhile, as for the metadata in the virtual sensor, broadcast EPG data, HDMI, text caption, voice caption, and the like may be input, and in response to the respective inputs, the AI processor 1230 may perform processing such as connecting selected content information with taste in viewing, connecting a frequency of selection with a viewing habit, using metadata and text data provided as caption, converting the caption provided as voice into text, etc., and may perform content recommendation, automatic reservation for viewing, automatic turning on, processing according to standards, identifying the details of text-based content, and the like.

FIG. 21 is an example of an internal block diagram of an image display apparatus according to another embodiment of the present disclosure.

Referring to the drawing, the signal processing apparatus 170 may comprise an object detector 2120 configured to detect an object in an input image, an object recognition trainer configured to perform training for object recognition, and an object recognizer 2170 configured to recognize an object based on information from the object recognition trainer 2160 and the detected object. Accordingly, object recognition may be performed based on AI.

Meanwhile, the signal processing apparatus 170 may further comprise an object information processor 1240 configured to process object recognition information, and an object region processor 2130.

The information processed by the object region processor 1230 may be transmitted to the server 600 through the network transmitter 135a in the network interface 135, and object recognition information, which is recognized by the object recognizer 630 of the server 600, may be input to the object information processor 2140 through the network receiver 135b in the network interface 135. Accordingly, object recognition may be performed based on information from an external server.

Meanwhile, the object recognizer 2170 may recognize an object based on the information from the object recognition trainer 2160, the detected object, and the object recognition information received from an external source. Accordingly, object recognition may be performed based on AI.

Meanwhile, once an image is input into the image display apparatus 100, it is preferable to process the image to a size suitable for object detection processing, rather than using the original image as it is.

That is, by generating the image at several resolution levels, the object of various sizes may be easily analyzed.

For example, when a face is detected, the size of the face shown on the screen may considerably vary depending on a camera acquiring the image and a producer's intention. The face may have various sizes, ranging from a small face to a large face that fills the entire screen.

In the case of a large face size, by using a face image which is reduced in size, the face may be similar in size to a small face of an original resolution, such that an input for face detection processing may be normalized.

After the object is detected, object region information is transmitted so that the server 600 may recognize the object.

Meanwhile, upon receiving the object recognition information from the server 600, the image display apparatus 100 may process the object recognition information, and may output the result through the display 180 or the audio output device.

Meanwhile, recognition of some object may be performed in the image display apparatus 100.

Meanwhile, as for a sound input, recognition of the sound of each object may be performed with the same concept, and the image display apparatus 100 may learn the object sound recognition.

Figure 22:
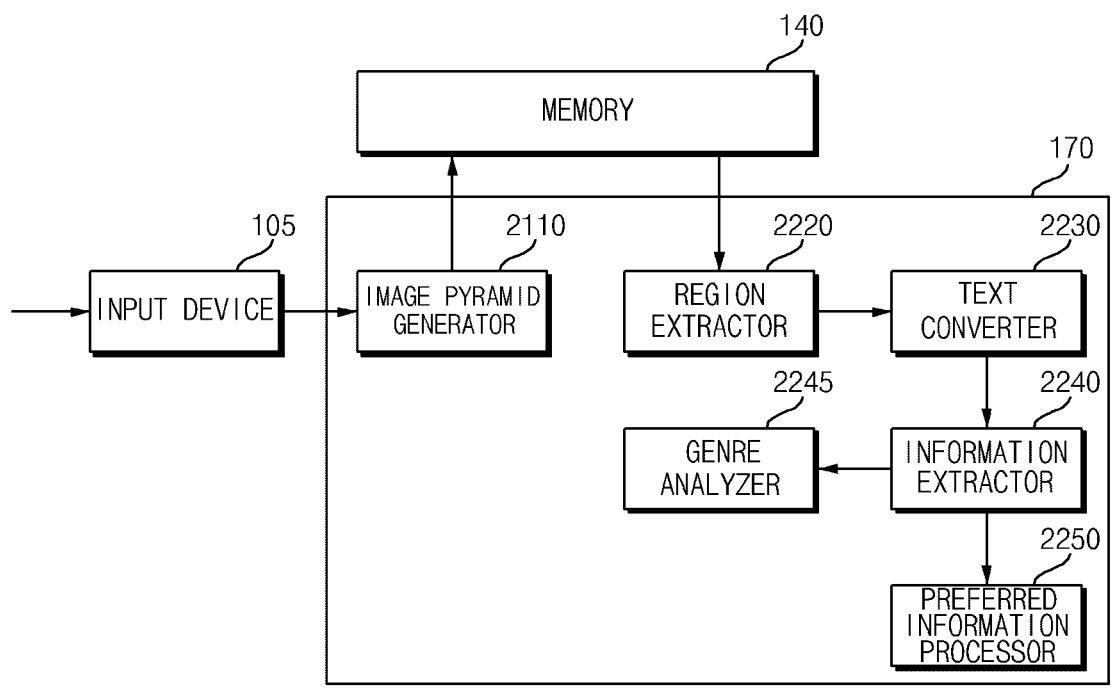
FIG. 22 is an example of an internal block diagram of a signal processing apparatus according to another embodiment of the present disclosure.
Figure 23:
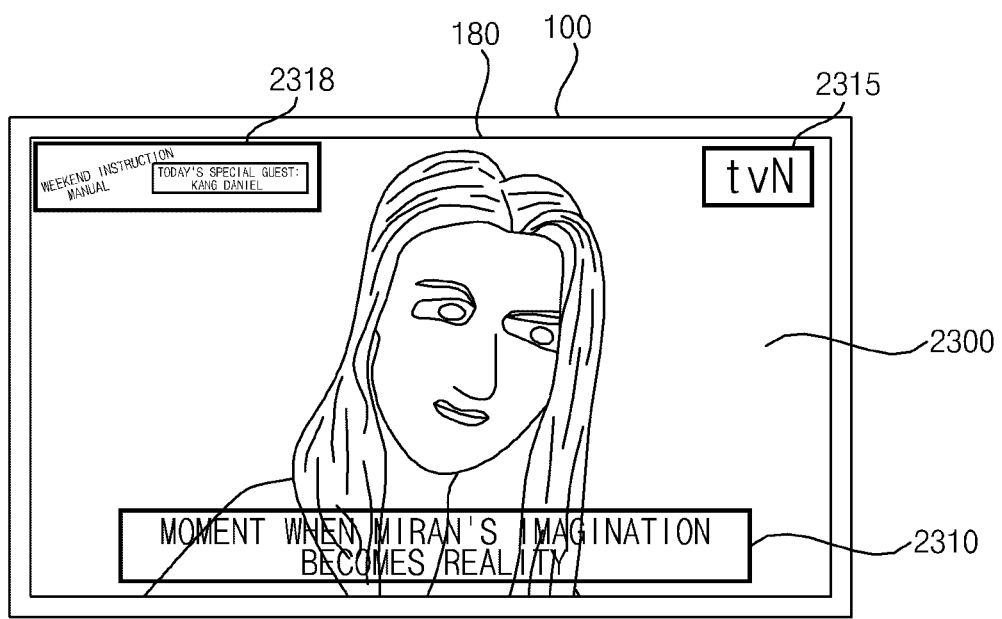
FIG. 23 is a diagram referred to in the description of operation of FIG. 22.

FIG. 22 is an example of an internal block diagram of a signal processing apparatus according to another embodiment of the present disclosure, and FIG. 23 is a diagram referred to in the description of operation of FIG. 22.

Meanwhile, the signal processing apparatus 170 may comprise a region extractor 2220 configured to extract a text region in an input image, a text converter configured to convert the extracted text region into text, an information extractor configured to extract information from the converted text, and a genre analyzer configured to analyze a genre of the extracted information. Accordingly, text conversion may be performed based on AI.

FIG. 23 illustrates an example in which while an image 2300 is displayed on the display 180, a program title 2318 is displayed on a left upper end, a broadcasting company logo 2315 is displayed on a right upper end, and subtitles 2310 are displayed on a lower end.

As described above, in the case where text in various forms is inserted into the image 2300, specific regions, such as the left upper end, the right upper end, and the lower end, may be extracted, and text conversion of the extracted regions may be performed.

Further, based on the converted text, information about the image displayed on the image display apparatus 100, particularly program information, may be obtained.

Such information may be used for processing statistics for obtaining channels and programs preferred by a viewer, and may be used for optimal setting of an image quality/sound for each genre.

In the extracted regions, a representative region may be designated to include displayed text regions of most broadcast programs.

Alternatively, if display characteristics are different for each broadcasting company, extracted regions may be designated separately for each broadcasting company.

In this case, text may be classified easily based on information itself whether the text is included in the region.

The text converter 2230 may extract text from the extracted regions.

The text may be extracted by applying a signal processing method of extracting and matching an edge, or each letter (Hangeul (Korean alphabet), alphabet) may be extracted using deep learning.

The broadcasting company logo or program information are provided in text form to the image display apparatus 100 in a broadcast EPG or through a network and the like, such that information may be extracted by comparing the information with text in a database of information items to be used in the image display apparatus 100.

Genre information for each program is also known, such that after extracting the information, the genre information may be classified so that an image or sound display method may be changed for each genre. Meanwhile, preference information for each user may be accumulated for later use.

Meanwhile, the image display apparatus 100 according to an embodiment of the present disclosure may be an image display apparatus 100 based on AI, which not only provides content, but also communicates with viewers by analyzing content and viewer responses.

Although the exemplary embodiments have been illustrated and described, embodiments are not limited to the above-described particular embodiments, various modifications are possible by those skilled in the art without departing from the scope and spirit as disclosed in the accompanying claims and these modifications should not be understood separately from the scope and spirit.

What is claimed is:
1. An image display apparatus comprising:
a signal processor configured to perform image processing of an input image, and audio processing of audio corresponding to the input image;
a virtual sensor device configured to receive image and audio information processed by the signal processor;

a sensor device configured to collect externally captured image information or sound information; and an artificial intelligence (AI) processor configured to:
perform the image processing of the input image or the audio processing based on AI using the image and audio information from the virtual sensor device, and the image or sound information from the sensor device, and when recognition of an ambient illumination value, ambient noise, and speech is performed based on an activation of an illumination sensor and a microphone after the image display apparatus is turned on, perform a preferred picture quality setting corresponding to the ambient illuminance value and perform a preferred volume setting corresponding to the ambient noise and viewer identification based on the speech, wherein the signal processor or the AI processor is configured to:

in response to a resolution of the input image being changed, calculate an original resolution and a compression level of the input image based on learning using a neural network, and perform image quality processing corresponding to the calculated original resolution of the input image, as the calculated original resolution increases, increase an enhancement intensity for the input image, as the calculated compression level increases, increase a blurring intensity for the input image, and in response to the original resolution of the input image being changed while reproducing the input image, sequentially change an image quality setting of the input image from a first setting to a second setting.

2. The image display apparatus of claim 1, wherein:
the signal processor is configured to process data associated with the input image;
the virtual sensor device is configured to receive data information processed by the signal processor; and
the AI processor is configured to perform the image processing of the input image or the audio processing based on AI using the data information, the image and audio information from the virtual sensor device, and the image or sound information from the sensor device.

3. The image display apparatus of claim 1, wherein:
the signal processor receives a user input signal from a remote controller;
the sensor device is configured to collect information on the user input signal; and
the AI processor is configured to perform the image processing of the input image or the audio processing based on AI using the information on the user input signal, the image and audio information from the virtual sensor device, and the image or sound information from the sensor device.

4. The image display apparatus of claim 1, wherein:
the sensor device is configured to collect viewing environment information based on illumination information from the illumination sensor and motion information from a motion sensor; and
the AI processor is configured to perform the image processing of the input image or the audio processing based on AI using the viewing environment information, the image and audio information from the virtual sensor device, and the image or sound information from the sensor device.

5. The image display apparatus of claim 1, wherein the sensor device is configured to collect externally captured image information from a camera, and collects external sound information from the microphone.

6. The image display apparatus of claim 1, wherein the viewing environment information comprises at least one of screen brightness information and viewing concentration information.

7. The image display apparatus of claim 1, wherein the signal processor comprises an image quality processor configured to perform image quality processing,
wherein the image quality processor is configured to perform the image quality processing according to an image quality set by the AI processor, based on the image information from the virtual sensor device, and the image information from the sensor device.

8. The image display apparatus of claim 7, wherein based on an image type of the input image and viewing environment information related to a viewer, the signal processor is configured to perform the image quality processing according to the image quality set by the AI processor.

9. The image display apparatus of claim 1, wherein based on on-time information of the image display apparatus, channel information, video genre information, and image quality setting information according to illumination, the signal processor is configured to perform the image quality processing according to the image quality set by the AI processor.

10. The image display apparatus of claim 1, wherein the signal processor comprises an audio processor configured to perform audio processing,
wherein based on the audio information from the virtual sensor device and the sound information from the sensor device, the audio processor is configured to perform the audio processing according to a sound quality set by the AI processor.

11. The image display apparatus of claim 1, wherein based on an audio type of the audio corresponding to the input image, and the viewing environment information related to the viewer, the signal processor is configured to perform the audio processing according to the sound quality set by the AI processor.

12. The image display apparatus of claim 1, wherein based on on-time information of the image display apparatus, channel information, video genre information, and volume setting information in response to the ambient noise, the signal processor is configured to perform the audio processing according to the sound quality set by the AI processor.

13. The image display apparatus of claim 1, further comprising a remote controller including a volume control key, an image quality control key, and a channel control key,
wherein based on at least one of brightness, contrast, sharpness, and chroma information set by the image quality control key, the signal processor is configured to perform the image quality processing according to the image quality set by the AI processor.

14. The image display apparatus of claim 1, wherein based on viewer position information which is calculated using image information captured by the sensor device, the signal processor is configured to perform the image quality processing according to the image quality set by the AI processor.

15. The image display apparatus of claim 1, wherein based on the viewer position information which is calculated using the image information captured by the sensor device, the signal processor is configured to perform the audio processing according to the sound quality set by the AI processor.

16. The image display apparatus of claim 1, wherein the signal processor comprises:
- an object detector configured to detect an object in the input image;
- an object recognition trainer configured to perform training for object recognition; and
- an object recognizer configured to recognize an object based on information from the object recognition trainer and the detected object.

17. The image display apparatus of claim 16, wherein the signal processor further comprises an object information processor configured to process object recognition information from an external source,
- wherein the object recognizer is configured to recognize an object based on information from the object recognition trainer, the detected object, and the object recognition information received from the external source.

18. The image display apparatus of claim 16, wherein the signal processor comprises:
- a region extractor configured to extract a text region in the input image;
- a text converter configured to convert the extracted text region into text;
- an information extractor configured to extract information from the converted text; and
- a genre analyzer configured to analyze a genre of the extracted information.

19. The image display apparatus of claim 1, wherein the artificial intelligence (AI) processor is further configured to:
- in response to operation of a volume control key of a remote controller and the ambient noise through the microphone, perform analysis of a volume control pattern and perform automatic volume control based on a result of the analysis.

* * * * *